US008319381B2

(12) United States Patent
Hino et al.

(10) Patent No.: US 8,319,381 B2
(45) Date of Patent: Nov. 27, 2012

(54) AUTOMOTIVE ELECTRIC MOTOR-GENERATOR WITH RADIAL PLATES AND CIRCUIT BOARDS DISPOSED IN A FAN SHAPE IN A COMMON PLANE AROUND SHAFT OF ROTOR

(75) Inventors: Yasunari Hino, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/085,661

(22) Filed: Apr. 13, 2011

(65) Prior Publication Data

US 2011/0187212 A1 Aug. 4, 2011

Related U.S. Application Data

(62) Division of application No. 12/095,943, filed as application No. PCT/JP2006/324567 on Dec. 8, 2006, now Pat. No. 7,960,880.

(30) Foreign Application Priority Data

Dec. 16, 2005 (JP) .................. 2005-363180
Dec. 16, 2005 (JP) .................. 2005-363196

(51) Int. Cl.
*H02K 9/06* (2006.01)
*H02K 11/04* (2006.01)
*H02K 9/00* (2006.01)
*H02K 11/00* (2006.01)
*H02K 29/00* (2006.01)

(52) U.S. Cl. .................. 310/52; 310/68 R; 310/68 D

(58) Field of Classification Search .................. 310/52, 310/62, 63, 64, 68 R, 68 D, 71, 253; *H02K 29/00, H02K 9/00, 9/02, 9/04, 9/06, 11/00, 11/04*
See application file for complete search history.

(56) References Cited

U.S. PATENT DOCUMENTS

| 5,357,160 | A  | * | 10/1994 | Kaneda et al. | ............. | 310/67 R |
| 5,682,070 | A  |   | 10/1997 | Adachi et al. | | |
| 6,285,100 | B1 | * | 9/2001  | Pflueger et al. | ............. | 310/68 D |
| 6,525,438 | B1 | * | 2/2003  | Asao | ............. | 310/68 D |
| 6,528,912 | B2 |   | 3/2003  | Asao | | |
| 6,787,952 | B2 | * | 9/2004  | Asao | ............. | 310/68 D |
| 2003/0015928 | A1 | * | 1/2003 | Asao | ............. | 310/68 D |
| 2005/0001492 | A1 | * | 1/2005 | Bradfield et al. | ............. | 310/68 D |
| 2005/0258690 | A1 | * | 11/2005 | Kusumi | ............. | 310/68 D |

FOREIGN PATENT DOCUMENTS

JP 56-63282 U 5/1981

(Continued)

*Primary Examiner* — Quyen Leung
*Assistant Examiner* — Michael Andrews
(74) *Attorney, Agent, or Firm* — Sughrue Mion, PLLC

(57) ABSTRACT

The present invention provides an automotive electric motor-generator that can achieve sufficient cooling of a radiating plate by ensuring a sufficient cooling airflow ventilation channel within limited axial or radial dimensions. In the present invention, first and second radiating plates each form a fan shape, have N-channel power MOSFETs mounted thereto, and have a drain potential for the power MOSFETs. A first circuit board includes insert conductors that connect the power MOSFETs in series, and a second circuit board has insert conductors that are connected to source terminals of the power MOSFETs and that have negative potential. The first radiating plate, the second radiating plate, the first circuit board, and the second circuit board are disposed in a fan shape that is centered around a shaft so as to line up radially in a plane that is perpendicular to the shaft outside one axial end of a rear housing.

9 Claims, 24 Drawing Sheets

FOREIGN PATENT DOCUMENTS

| | | |
|---|---|---|
| JP | 2001-268869 A | 9/2001 |
| JP | 2004-153872 A | 5/2004 |
| JP | 2004-208487 A | 7/2004 |
| JP | 2004-274876 A | 9/2004 |
| JP | 2005-117708 A | 4/2005 |
| JP | 2005-253184 A | 9/2005 |

* cited by examiner

AUTOMOTIVE ELECTRIC MOTOR-GENERATOR WITH RADIAL PLATES AND CIRCUIT BOARDS DISPOSED IN A FAN SHAPE IN A COMMON PLANE AROUND SHAFT OF ROTOR

CROSS-REFERENCE TO RELATED APPLICATIONS

This application is a Continuation Application of U.S. application Ser. No. 12/095,943 filed Jun. 3, 2008, which is a National Stage of International Application No. PCT/JP2006/324567 filed on Dec. 8, 2006, claiming priority based on Japanese Patent Application Nos. 2005-363180 and 2005-363196, both priority Japanese Applications filed Dec. 16, 2005, the contents of all of which are incorporated herein by reference in their entirety.

TECHNICAL FIELD

The present invention relates to an automotive electric motor-generator that has an internal control apparatus, that is mounted to a vehicle, and that has engine starting, assisting, and generating functions, and particularly relates to reductions in size of a control apparatus that has power semiconductor elements, as well as improvements in reliability that include superior cooling, vibration resistance, and dielectric strength.

BACKGROUND ART

In recent years, reductions in $CO_2$ emissions are being sought with a view to preventing global warming, and hybrid vehicles, idling-reduced vehicles, etc., are being developed in earnest. When connecting control apparatuses and automotive electric motor-generators in such vehicles, wiring length is increased if the control apparatus and the automotive electric motor-generator are separated greatly. Because wiring resistance between the control apparatus and the automotive electric motor-generator is thereby increased, increasing voltage drop, it has been difficult to achieve desired torque characteristics, rotational frequencies, etc. Other problems have been increased weight, and increased cost, etc., due to the increased wiring length.

In view of these conditions, an integrated control apparatus automotive electric motor-generator that includes semiconductor elements has been proposed (see Patent Literature 1, for example). This control apparatus has a construction that is constituted by three radiating plates that have differing electric potentials. In order to satisfy cooling efficiency, the semiconductor elements and electrode plates are configured so as to be in a ratio that is greater than or equal to 5.
Patent Literature 1: Japanese Patent Laid-Open No. 2004-208487 (Gazette)

DISCLOSURE OF THE INVENTION

Problem to be Solved by the Invention

Space for installing automotive electric motor-generators inside engine compartments is becoming extremely restricted. Thus, it is necessary to aim for size reductions in the overall construction of control apparatuses that are mounted internally in automotive electric motor-generators. On the other hand, because the quantity of heat generated by the semiconductor elements is particularly large in control apparatuses, it has been necessary to suppress temperature increases in the semiconductor elements by increasing the size of the radiating plates. Thus, the radiating plates for cooling the semiconductor elements occupy a large portion of the volume of the control apparatus in conventional integrated control apparatus automotive electric motor-generators.

In conventional integrated control apparatus automotive electric motor-generators, a radiating plate that corresponds to an upper arm switching drain side on which N-channel semiconductor elements are mounted and a radiating plate that corresponds to a lower arm switching drain side are disposed so as to line up in a radial direction of a rotating shaft, and in addition an electrode plate that has negative potential is disposed one step below those radiating plates in an axial direction of the rotating shaft.

Thus, in conventional integrated control apparatus automotive electric motor-generators, because the two radiating plates that correspond to the upper and lower arm switching drain sides and the electrode plate that has negative potential are arrayed in two layers axially, axial dimensions of the automotive electric motor-generator are increased.

Arraying the two radiating plates and the electrode plate in two layers axially within limited axial dimensions makes it harder to ensure sufficient cooling airflow ventilation channels, making it difficult to ensure sufficient cooling of the two radiating plates onto which are mounted the semiconductor elements that need to be cooled the most.

In conventional integrated control apparatus automotive electric motor-generators, the radiating plate that corresponds to the upper arm switching drain side and the radiating plate that corresponds to the lower arm switching drain side are disposed so as to form two layers radially on a common plane that is perpendicular to the rotating shaft so as to fill all permissible space in the radial direction of the automotive electric motor-generator. Thus, because the heat radiating area of the two radiating plates cannot be enlarged any further in the radial direction of the rotating shaft, it has been difficult to ensure the desired heat radiating area of the two radiating plates within the limited radial dimensions.

Cooling of these radiating plates is performed by cooling airflows that arise due to rotation of a fan that is mounted to the rotor. However, because the two radiating plates are disposed on a common plane that is perpendicular to the rotating shaft so as to fill all permissible space in the radial direction of the automotive electric motor-generator, there has not been sufficient heat exchange surface area for axial flow of the cooling airflows to pass through and cool the two radiating plates. In addition, it has also been difficult to ensure sufficient ventilation channel area for the cooling airflows to pass through between the two radiating plates.

Furthermore, in addition to heat exchange surface area and ventilation channel area also being problematic for radial flow of the cooling airflows to pass through and cool these radiating plates in a similar manner to the axial flow that is described above, since the cooling airflows also rise in temperature due to heat being exchanged at the radiating plate that corresponds to the lower arm switching drain side, which is positioned at an upstream end, and then cool the radiating plate that corresponds to the upper arm switching drain side, which is positioned at a downstream end, another problem has been that the radiating plate that corresponds to the upper arm switching drain side cannot be sufficiently cooled.

The present invention aims to solve the above problems and a first object of the present invention is to provide an automotive electric motor-generator that can achieve sufficient cooling of a radiating plate by ensuring a sufficient cooling airflow ventilation channel within limited axial dimensions.

A second object of the present invention is to provide an automotive electric motor-generator that can increase cooling of first and second radiating plates by making expansion of radial dimensions of the radiating plates possible within limited radial dimensions to ensure a desired heat radiating area on the radiating plates, and also enabling cooling airflows to flow radially over the two radiating plates without interfering with each other.

Means for Solving the Problem

An automotive electric motor-generator according to the present invention includes: a motor that has: a rotor that is rotatably disposed inside a housing; a stator that is disposed so as to surround a radially-outer side of the rotor; and at least one fan that is fixed to an axial end surface of the rotor, the motor functioning as a generator and as an electric motor; and a power semiconductor apparatus that controls a current that is supplied to the motor. The power semiconductor apparatus includes: a fan-shaped first radiating plate to which a first switching element that is constituted by an N-channel semiconductor element is mounted, and that has a drain potential for the first switching element; a fan-shaped second radiating plate to which a second switching element that is constituted by an N-channel semiconductor element is mounted, and that has a drain potential for the second switching element; a fan-shaped first circuit board in which a first electrode member that connects the first switching element and the second switching element electrically in parallel is insert molded into a first insulating resin; and a fan-shaped second circuit board in which a second electrode member that is electrically connected to a source terminal of the second switching element and that has negative potential is insert molded into a second insulating resin. In addition, the first radiating plate, the second radiating plate, the first circuit board, and the second circuit board are disposed in a fan shape that is centered around a shaft of the rotor so as to line up radially in a plane that is perpendicular to the shaft outside one axial end of the housing.

An automotive electric motor-generator according to the present invention includes: a motor that has: a rotor that is rotatably disposed inside a housing; a stator that is disposed so as to surround a radially-outer side of the rotor; and at least one fan that is fixed to an axial end surface of the rotor, the motor functioning as a generator and as an electric motor; and a power semiconductor apparatus that controls a current that is supplied to the motor. The power semiconductor apparatus includes: a fan-shaped first radiating plate that is disposed in a fan shape that is centered around a shaft of the rotor in a plane that is perpendicular to the shaft outside a first axial end of the housing, to which a first switching element that is constituted by an N-channel semiconductor element is mounted, and that has a drain potential for the first switching element; and a fan-shaped second radiating plate that is disposed in a fan shape that is centered around the shaft in a plane that is perpendicular to the shaft of the rotor between the first radiating plate and a first axial end surface of the housing, to which a second switching element that is constituted by an N-channel semiconductor element is mounted, and that has a drain potential for the second switching element.

Effects of the Invention

According to the present invention, because the first and second radiating plates and the first and second circuit boards can be disposed in a single layer axially, axial dimensions of the power semiconductor apparatus are reduced, enabling sufficient cooling airflow ventilation channels to be ensured even within limited axial dimensions. Desired heat radiating area, i.e., heat exchange surface area, can also be ensured in the first and second radiating plates. Thus, cooling of the first and second radiating plates is improved, enabling temperature increases in the first and second switching elements to be efficiently suppressed.

According to the present invention, because the first and second radiating plates can be disposed in two layers axially, it is possible to enlarge the dimensions of the first and second radiating plates radially, enabling desired heat radiating area, i.e., heat exchange surface area, to be ensured in the first and second radiating plates even within limited radial dimensions. Because cooling airflows flow radially over two surfaces of the first radiating plate and two surfaces of the second radiating plate without interfering with each other, heat that is generated by the first and second switching elements can be radiated effectively from the first and second radiating plates. In addition, in the radial flow of the cooling airflows, cooling airflows in which temperature has been increased by exchanging heat at the first radiating plate are not supplied to cool the second radiating plate, improving cooling by the first and second radiating plates.

BEST MODE FOR CARRYING OUT THE INVENTION

Embodiment 1

Figure 1:
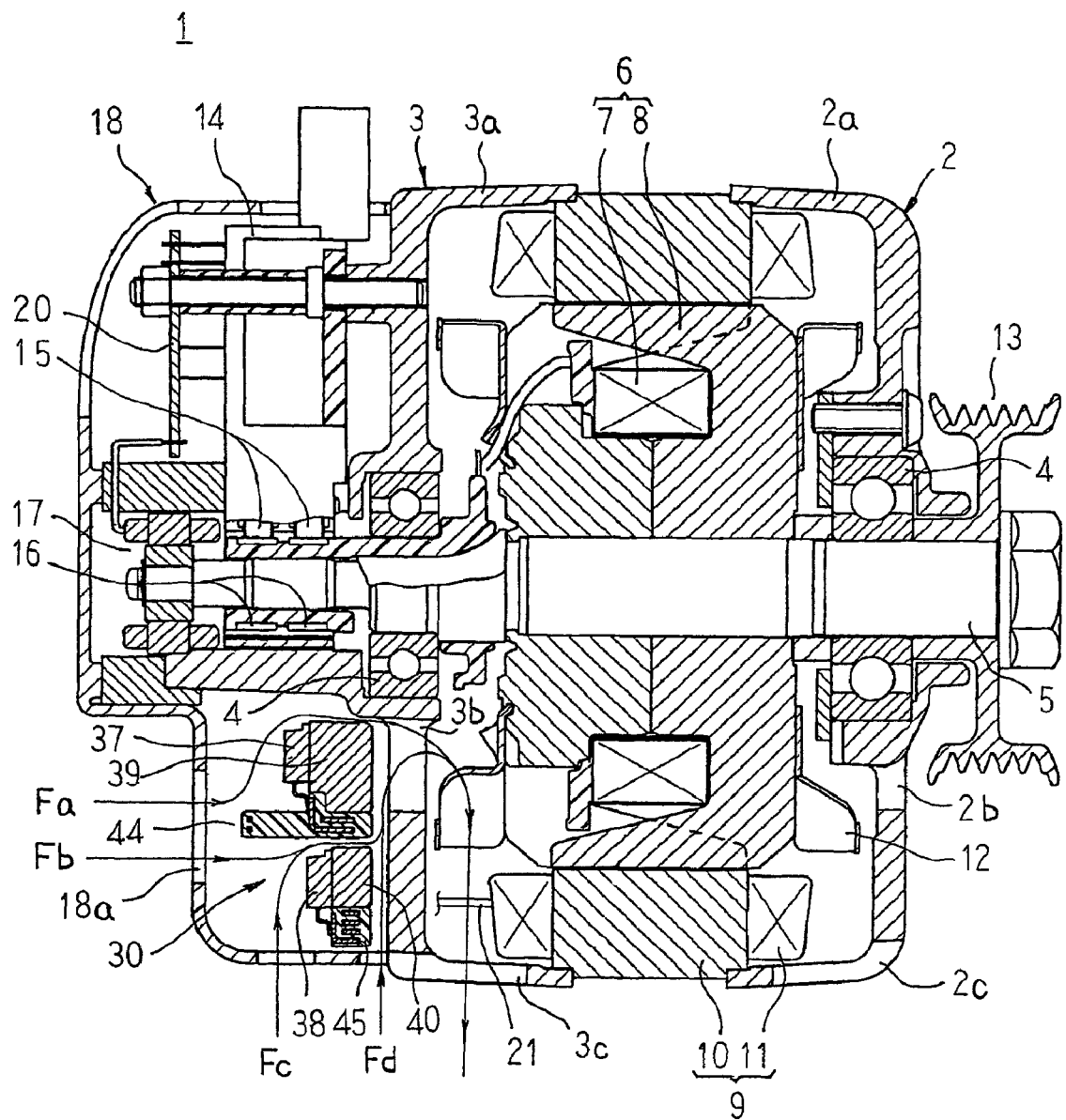
FIG. 1 is a longitudinal section that shows an overall configuration of an automotive electric motor-generator according to Embodiment 1 of the present invention.
Figure 2:
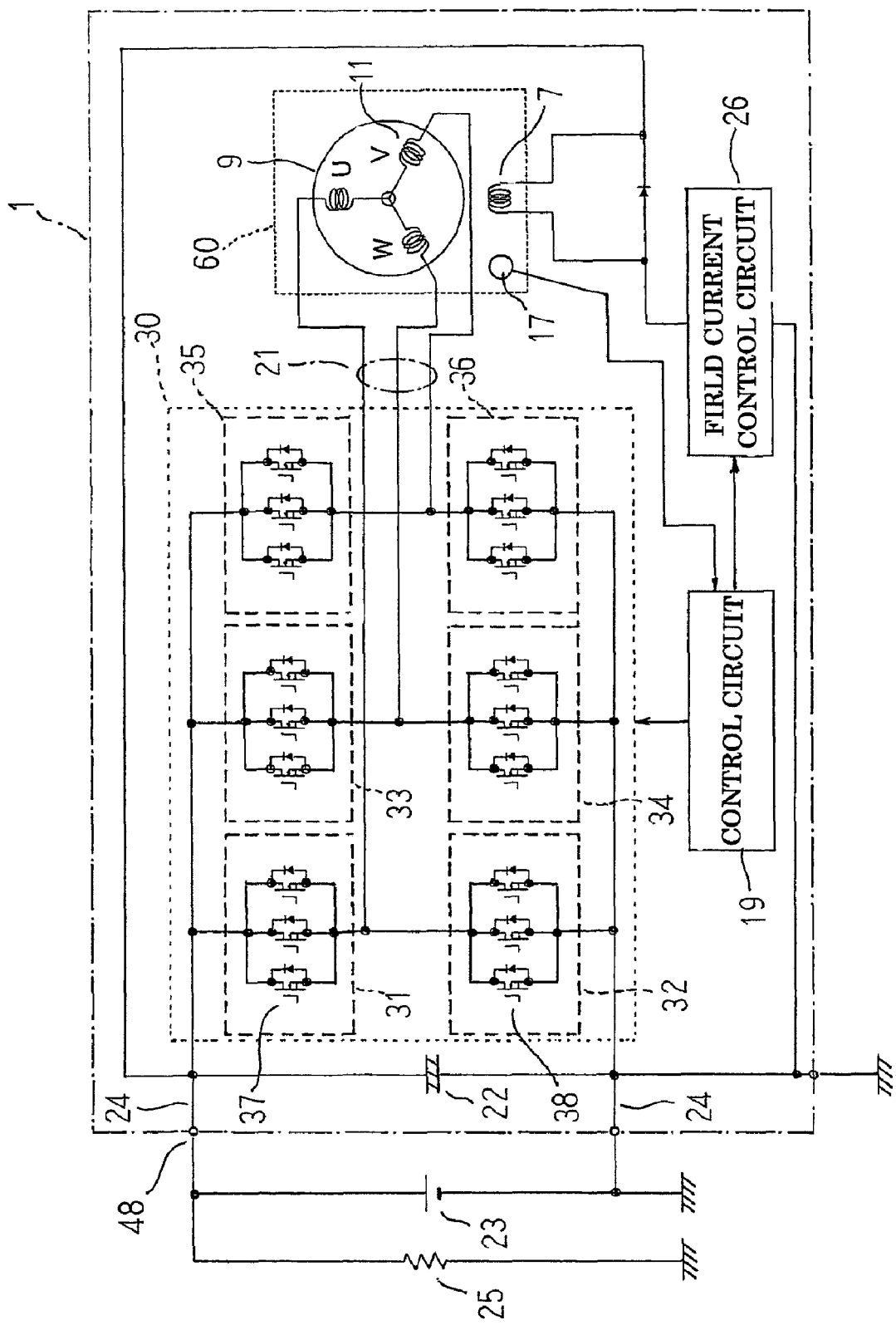
FIG. 2 is a circuit diagram for explaining operation of the automotive electric motor-generator according to Embodiment 1 of the present invention.
Figure 3:
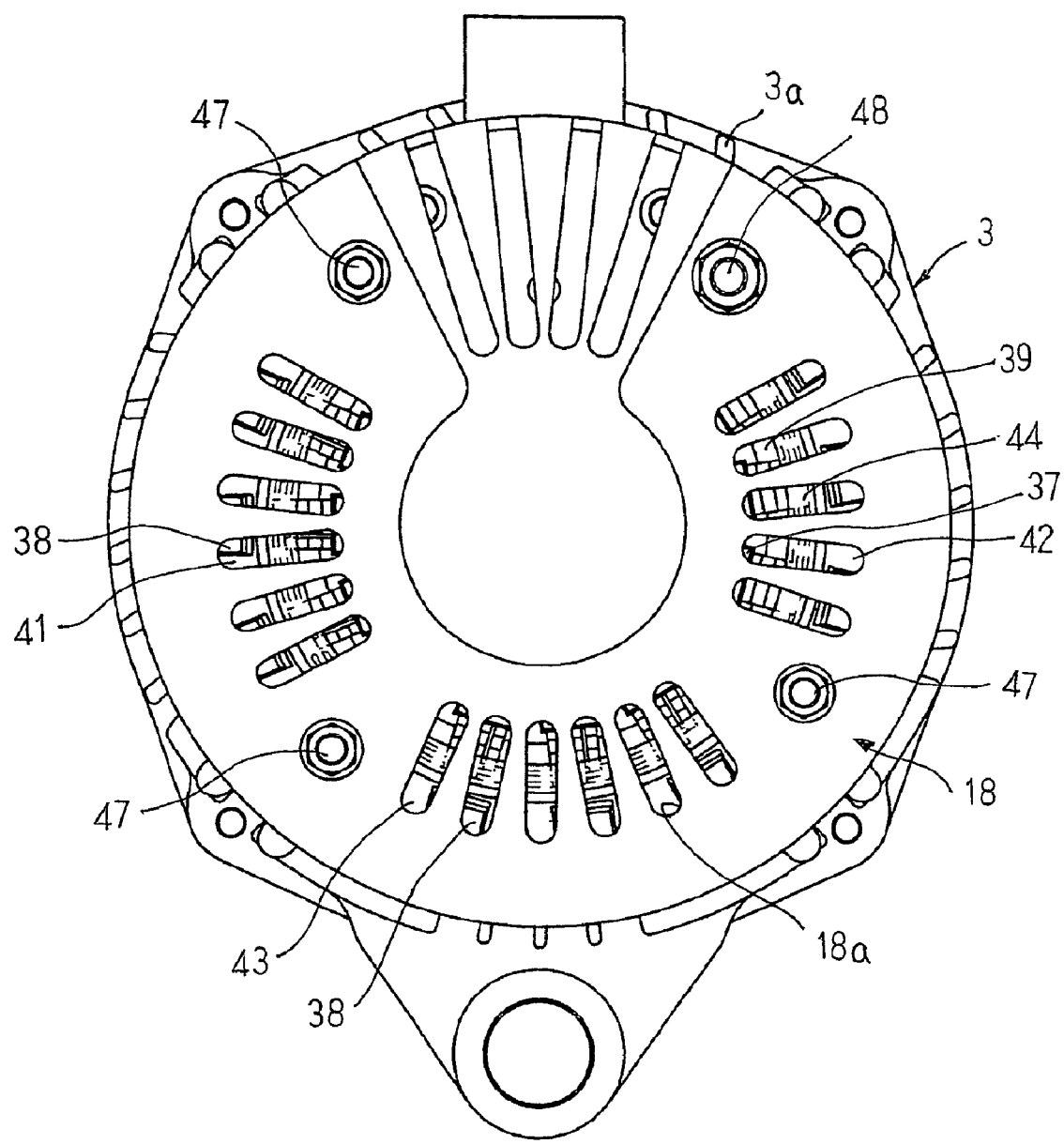
FIG. 3 is a rear-end end elevation, as seen from the rear side, of the automotive electric motor-generator according to Embodiment 1 of the present invention.
Figure 4:
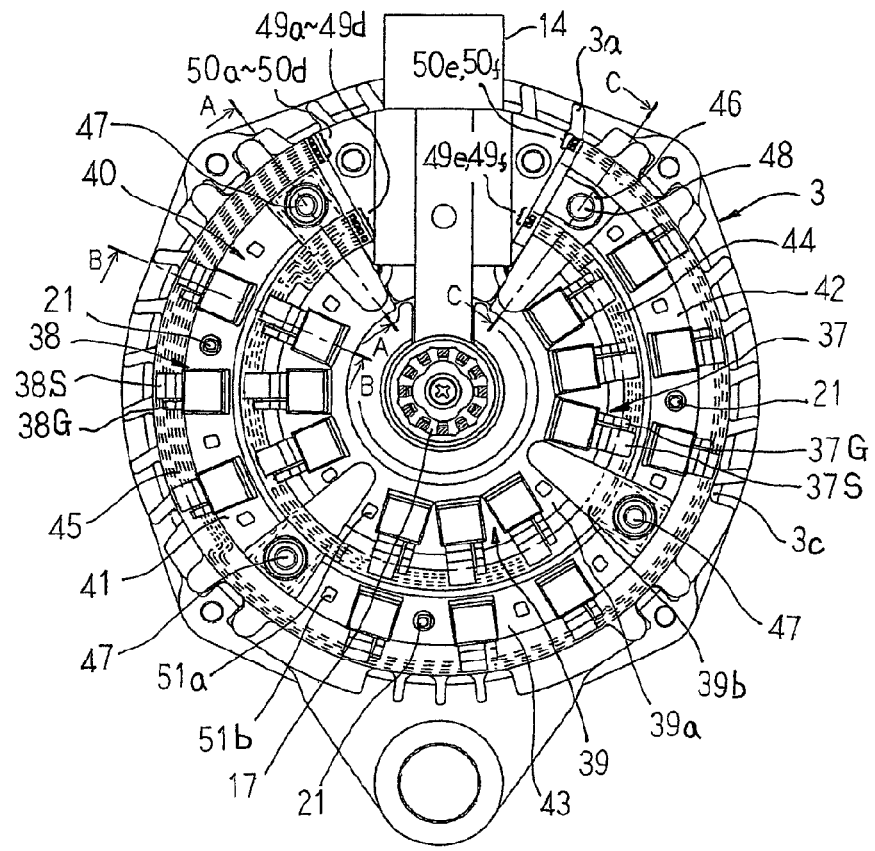
FIG. 4 is a rear-end end elevation, as seen from the rear side, of the automotive electric motor-generator according to Embodiment 1 of the present invention in a state in which a cover has been removed.
Figure 5:
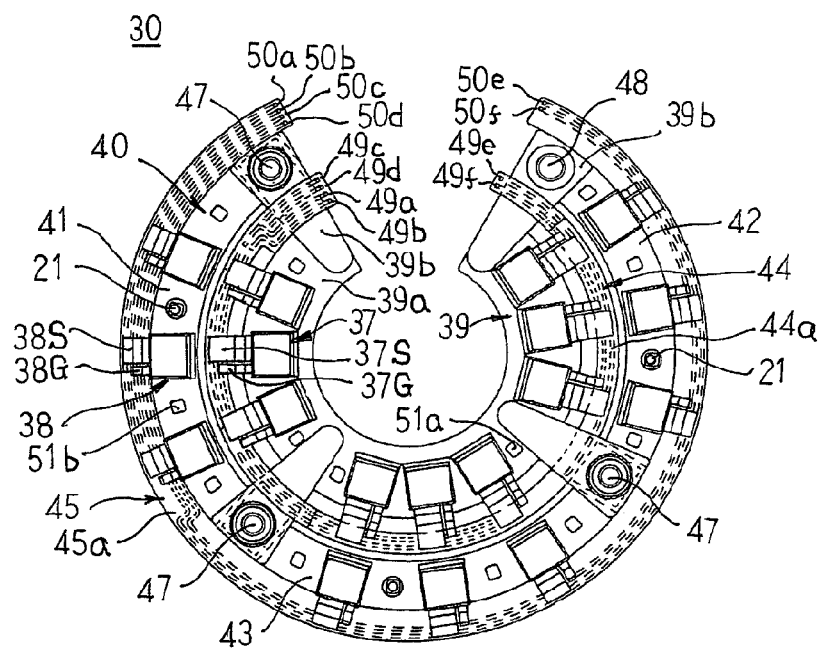
FIG. 5 is a plan that shows a control apparatus in the automotive electric motor-generator according to Embodiment 1 of the present invention.
Figure 6:
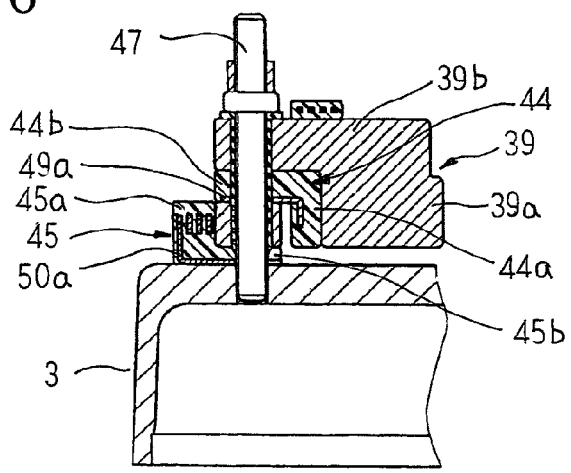
FIG. 6 is a cross section that is taken along line A-A in FIG. 4 so as to be viewed in the direction of the arrows.
Figure 7:
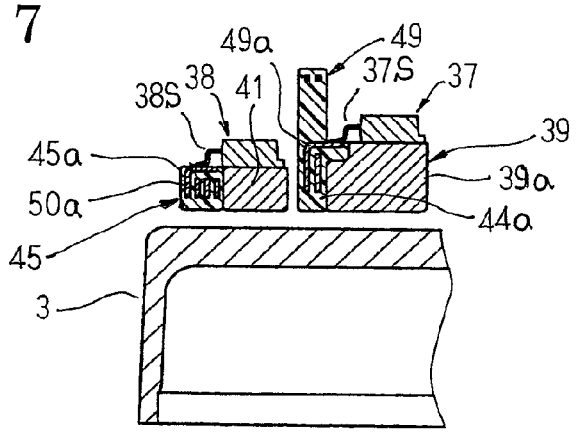
FIG. 7 is a cross section that is taken along line B-B in FIG. 4 so as to be viewed in the direction of the arrows.
Figure 8:
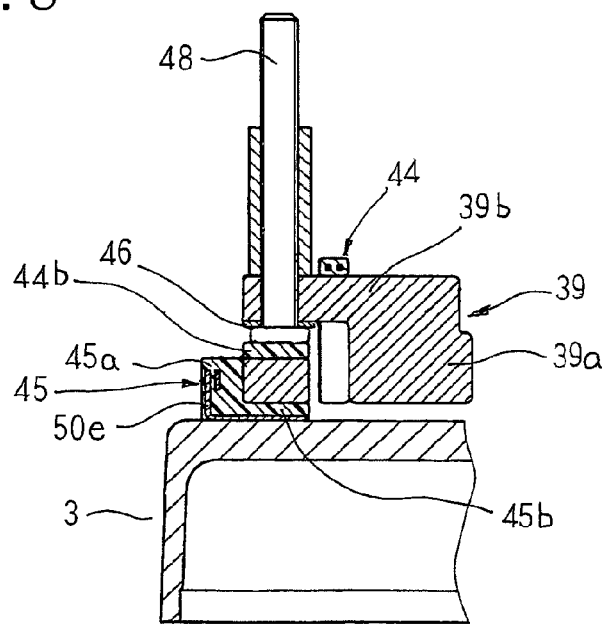
FIG. 8 is a cross section that is taken along line C-C in FIG. 4 so as to be viewed in the direction of the arrows.

FIG. 1 is a longitudinal section that shows an overall configuration of an automotive electric motor-generator according to Embodiment 1 of the present invention, FIG. 2 is a circuit diagram for explaining operation of the automotive electric motor-generator according to Embodiment 1 of the present invention, and FIG. 3 is a rear-end end elevation, as seen from the rear side, of the automotive electric motor-generator according to Embodiment 1 of the present invention. FIG. 4 is a rear-end end elevation, as seen from the rear side, of the automotive electric motor-generator according to Embodiment 1 of the present invention in a state in which a cover has been removed, FIG. 5 is a plan that shows a control apparatus in the automotive electric motor-generator according to Embodiment 1 of the present invention, FIG. 6 is a cross section that is taken along line A-A in FIG. 4 so as to be viewed in the direction of the arrows, FIG. 7 is a cross section that is taken along line B-B in FIG. 4 so as to be viewed in the direction of the arrows, and FIG. 8 is a cross section that is taken along line C-C in FIG. 4 so as to be viewed in the direction of the arrows.

In FIGS. 1 through 3, a motor 60 that constitutes part of an automotive electric motor-generator 1 includes: a front housing 2 and a rear housing 3 that are made of aluminum that have a plurality of air discharge aperture ribs 2a and 3a; a shaft 5 that is rotatably supported in the front housing 2 and the rear housing 3 by means of a bearing 4; a rotor 6 that is fixed to the shaft 5; and a stator 9 that is disposed so as to surround the rotor 6. The rotor 6 includes: a field winding 7 that generates magnetic flux on passage of an excitation current; and a pole core 8 that is disposed so as to cover the field winding 7 and in which magnetic poles are formed by the magnetic flux. The stator 9 includes: a stator core 10 that is disposed so as to be held between the front housing 2 and the rear housing 3 from two axial ends so as to surround the rotor 6; and an armature winding 11 that is installed in the stator core 10. The armature winding 11 is configured by wye-connecting (star-connecting) a U-phase coil, a V-phase coil, and a W-phase coil.

Fans 12 are welded onto two axial end surfaces of the pole core 8, and a pulley 13 is fixed by a nut to an end portion of the shaft 5 that projects out through the front housing 2. A brush holder 14 is mounted to the rear housing 3 so as to be positioned radially outside an end portion of the shaft 5 that projects out through the rear housing 3. Brushes 15 are disposed inside the brush holder 14 so as to slide in contact with slip rings 16 that are mounted to the end portion of the shaft 5 that projects out through the rear housing 3. The excitation current is supplied to the field winding 7 from outside by means of the brushes 15 and the slip rings 16. In addition, a rotational position detecting sensor 17 for vector control during electric drive is disposed on an axial end of the shaft 5 that projects out through the rear housing 3.

In addition to the motor 60 that is described above, a control apparatus 30 that constitutes a power semiconductor apparatus is mounted to the rear housing 3 in the automotive electric motor-generator 1 so as to be positioned radially outside the end portion of the shaft 5 that projects out through the rear housing 3.

A cover 18 is mounted onto the rear housing 3 so as to cover a control circuit board 20 to which a control circuit 19 is mounted, the control apparatus 30, and the brush holder 14 so as to prevent external foreign matter from entering. In addition, a plurality of air intake apertures 18a are disposed through end surfaces and side wall surfaces of the cover 18.

Air intake apertures 2b and 3b are also disposed through end surfaces of the front housing 2 and the rear housing 3 in a vicinity of the shaft 5, and air discharge apertures 2c and 3c are disposed through side surfaces of the front housing 2 and the rear housing 3.

As shown in FIG. 2, the control apparatus 30 includes: three upper arms 31, 33, and 35 that are each configured by connecting three power MOSFETs 37 in parallel; and three lower arms 32, 34, and 36 that are each configured by connecting three power MOSFETs 38 in parallel. The sources of the three power MOSFETs 37 that are connected in parallel in the upper arm 31 are connected to the drains of the three power MOSFETs 38 that are connected in parallel in the lower arm 32. The sources of the three power MOSFETs 37 that are connected in parallel in the upper arm 33 are connected to the drains of the three power MOSFETs 38 that are connected in parallel in the lower arm 34. In addition, the sources of the three power MOSFETs 37 that are connected in parallel in the upper arm 35 are connected to the drains of the three power MOSFETs 38 that are connected in parallel in the lower arm 36. The control apparatus 30 is configured by connecting in parallel three sets of power MOSFETs 37 and 38 that have been connected in series in this manner. Here, power MOSFETs 37 and 38 have been used for the semiconductor elements, but semiconductor elements such as Insulated Gate Bipolar Transistors (IGBTs), etc., may also be used.

An intermediate point of the power MOSFETs 37 and 38 that are connected in series in the upper arm 31 and the lower arm 32 are connected to an end portion of the U-phase coil of the armature winding 11 by means of alternating-current wiring 21. An intermediate point of the power MOSFETs 37 and 38 that are connected in series in the upper arm 33 and the lower arm 34 are connected to an end portion of the W-phase coil of the armature winding 11 by means of the alternating-current wiring 21. An intermediate point of the power MOSFETs 37 and 38 that are connected in series in the upper arm 35 and the lower arm 36 are connected to an end portion of the W-phase coil of the armature winding 11 by means of the alternating-current wiring 21. A capacitor 22 is also connected in parallel between the upper and lower arms so as to smooth voltage fluctuations that result from switching of the power MOSFETs 37 and 38. A positive terminal and a negative terminal of a battery 23 are electrically connected to a positive electrode side and a negative electrode side, respectively, of the control apparatus 30 by means of direct-current wiring 24. Moreover, the negative electrode of the automotive electric motor-generator 1 and the negative electrode of the battery 23 may also be connected indirectly through separate positions on a vehicle frame, etc.

In an automotive electric motor-generator 1 that is configured in this manner, the control circuit 19 controls switching operations in the control apparatus 30. The control circuit 19 also controls a field current control circuit 26 so as to adjust a field current that is supplied to the field winding 7 of the rotor 6. In addition, the control circuit 19 has an inverter function for electric motor operation of the automotive electric motor-generator 1 and a rectifying function for power generation.

Here, during starting of an engine, direct-current power is supplied from the battery 23 to the control apparatus 30 by means of the direct-current wiring 24. The control circuit 19 that is mounted to the control circuit board 20 performs on-off control of the power MOSFETs 37 and 38 of the control apparatus 30 so as to convert the direct-current power to three-phase alternating-current power. The three-phase alternating-current power is supplied to the armature winding 11 by means of the alternating-current wiring 21. Thus, a rotating magnetic field is imparted around the field winding 7 of the rotor 6 to which a field current is being supplied by the field current control circuit 26, driving the rotor 6 to rotate. Rotational torque from the rotor 6 is transmitted to the engine by means of the shaft 5, the pulley 13, and a belt (not shown) so as to ignite and start the engine.

Then, once the engine has been started, rotational torque from the engine is transmitted to the automotive electric motor-generator 1 by means of a crank pulley, the belt, and the pulley 13. Thus, the rotor 6 is rotated, inducing a three-phase alternating-current voltage in the armature winding 11. Then, the control circuit 19 performs on-off control of the power MOSFETs 37 and 38 of the control apparatus 30 such that the three-phase alternating-current power that has been induced in the armature winding 11 is converted into direct-current power, and is supplied to the battery 23, and an electric load 25, etc.

Next, configuration of the control apparatus 30 will be explained with reference to FIGS. 4 through 8.

A first radiating plate 39 is made of copper and has been electroplated, and is formed so as to have a shape that has: a flat base portion 39a that has an approximate fan shape (a C shape); and flange portions 39b that are disposed so as to extend radially outward from a front surface of the base portion 39a at four positions that include two circumferential end portions of the base portion 39a and portions that divide the base portion 39a into three equal sections circumferentially. Nine N-channel power MOSFETs 37 are mounted to the first radiating plate 39 so as to line up in a single row circumferentially such that source terminals 37S and gate terminals 37G face radially outward by connecting drains thereof to the front surface (a mounting surface) of the base portion 39a using a lead-free solder. In addition, a plurality of ventilating apertures 51a are disposed so as to pass through the base portion 39a. Here, the power MOSFETs 37 correspond to a first switching element.

A first circuit board 44 is prepared by insert molding six insert conductors 49a through 49f, and is formed so as to have a shape that has: a base portion 44a that has an approximate fan shape (a C shape) that is parallel to an outer circumference of the base portion 39a of the first radiating plate 39; and flange portions 44b that are disposed so as to extend radially outward from an outer circumferential surface of the base portion 44a at four positions that include two circumferential end portions of the base portion 44a and portions that divide the base portion 44a into three equal sections circumferentially. The base portion 44a and the flange portions 44b constitute a first insulating resin. The base portion 44a of the first circuit board 44 is disposed so as to be parallel to the outer circumference of the base portion 39a of the first radiating plate 39, and the flange portions 44b are disposed in close contact with rear surfaces of the flange portions 39b of the first radiating plate 39. Moreover, the insert conductors 49a, 49c, and 49e correspond to a first electrode member.

First through third radiating plate segments 41 through 43 are formed so as to have approximately identical sizes, are each made of copper and have been electroplated, and are formed so as to have flat arc shapes that are larger than the base portion 44a of the first circuit board 44. A plurality of ventilating apertures 51b are disposed so as to pass through the first through third radiating plate segments 41 through 43. In addition, three N-channel power MOSFETs 38 are mounted to each of the first through third radiating plate segments 41 through 43 so as to line up in a single row circumferentially such that source terminals 38S and gate terminals 38G face radially outward by connecting drains thereof to respective surfaces (mounting surfaces) using a lead-free solder. The first through third radiating plate segments 41 through 43 are arrayed in a single row circumferentially so as to constitute a second radiating plate 40 that has an approximate fan shape (a C shape) that is larger than the base portion 44a of the first circuit board 44. Here, the power MOSFETs 38 correspond to a second switching element. A predetermined clearance is also configured between the base portion 44a of the first circuit board 44 and the first through third radiating plate segments 41 through 43.

A second circuit board 45 is prepared by insert molding six insert conductors 50a through 50f, and is formed so as to have an approximate fan shape (a C shape) that has: a base portion 45a that is parallel to an outer circumference of the second radiating plate 40; and flange portions 45b that extend radially inward from a rear surface of the base portion 45a at four positions that include two circumferential end portions of the base portion 45a and portions that divide the base portion 45a into three equal sections circumferentially. The base portion 45a and the flange portions 45b constitute a second insulating resin. Moreover, the insert conductors 50a, 50c, and 50e correspond to a second electrode member.

The second circuit board 45 is disposed in an approximate fan shape so as to be centered around a central axis of the rear housing 3 such that the flange portions 45b are placed in close contact with an end surface of the rear housing 3. The first through third radiating plate segments 41 through 43 are also disposed so as to line up in an approximate fan shape so as to be centered around the central axis of the rear housing 3 in close proximity to an inner circumferential side of the base portion 45a such that the mounting surfaces face axially outward and two end portions of each are placed on the flange portions 45b. The mounting surfaces of the first through third radiating plate segments 41 through 43 are positioned in a common plane with the front surface of the base portion 45a. In addition, the first circuit board 44 is disposed such that the flange portions 44b face the flange portions 45b of the second circuit board 45 across the first through third radiating plate segments 41 through 43. The first radiating plate 39 is disposed such that the mounting surface of the base portion 39a faces axially outward, the flange portions 39b are placed on the flange portions 44b of the first circuit board 44, and the base portion 39a is in close proximity to an inner circumferential side of the base portion 44a of the first circuit board 44.

The flange portions 39b at three positions that are not at a second circumferential end portion of the first radiating plate 39, the flange portions 44b at three positions that are not at a second circumferential end portion of the first circuit board 44, first circumferential end portions of each of the first through third radiating plate segments 41 through 43, and the flange portions 45b at three positions that are not at a second circumferential end portion of the second circuit board 45 are stacked axially on each other and securely fastened integrally to the rear housing 3 by mounting bolts 47. In addition, an output terminal bolt 48 that constitutes an external output terminal is mounted so as to pass through the flange portion 39b at the second circumferential end portion of the first radiating plate 39 from a rear surface side and project axially outward through the cover 18. A terminal 46 is interposed between a head portion of the output terminal bolt 48 and the flange portion 39b. The flange portion 44b of the first circuit board 44 is interposed between the output terminal bolt 48 and the third radiating plate segment 43 such that the two are in an insulated state.

Thus, except at their respective first and second circumferential end portions, the first through third radiating plate segments 41 through 43 are separated from a wall surface of the rear housing 3 by a distance equivalent to a thickness of the flange portions 45b of the second circuit board 45 so as to form cooling airflow ventilation channels. The base portion 44a of the first circuit board 44 is also disposed on an inner circumferential side of the first through third radiating plate segments 41 through 43 so as to ensure a predetermined clearance therebetween. In addition, the base portion 39a of the first radiating plate 39 is disposed on an inner circumferential side of the base portion 44a of the first circuit board 44 in close contact therewith. The rear surface of the base portion 45a of the second circuit board 45, rear surfaces of the first through third radiating plate segments 41 through 43, a rear surface of the base portion 44a of the first circuit board 44, and a rear surface of the base portion 39a of the first radiating plate 39 are positioned in a common plane. In other words, the base portion 45a of the second circuit board 45, the first through third radiating plate segments 41 through 43, the base portion 44a of the first circuit board 44, and the base portion 39a of the first radiating plate 39 are disposed in an approximate fan shape that is centered around a central axis of the shaft 5 so as to line up concentrically in a radial direction in a common plane that is perpendicular to the central axis of the shaft 5.

Two of the insert conductors 49a and 49c are insert-molded into the first circuit board 44 such that first ends are exposed at a first circumferential end portion front surface of the first circuit board 44, and second end portions are exposed on surfaces in regions that correspond to the source terminals 37S of the three power MOSFETs 37 that constitute the upper arms 31 and 35, respectively. Two of the insert conductors 49b and 49d are insert-molded into the first circuit board 44 such that first ends are exposed at the first circumferential end portion front surface of the first circuit board 44, and second end portions are exposed on surfaces in regions that correspond to the gate terminals 37G of the three power MOSFETs 37 that constitute the upper arms 31 and 35, respectively. Exposed surfaces of the second end portions of the insert conductors 49a through 49d are positioned in a common plane with the mounting surface of the first radiating plate 39. The source terminals 37S and the gate terminals 37G of the three power MOSFETs 37 that constitute the upper arms 31 and 35 are soldered to the exposed surfaces of the corresponding insert conductors 49a through 49d.

Two of the insert conductors 49e and 49f are insert-molded into the first circuit board 44 such that first ends are exposed at a second circumferential end portion front surface of the first circuit board 44, and second end portions are exposed on surfaces in regions that correspond to the source terminals 37S and the gate terminals 37G, respectively, of the three power MOSFETs 37 that constitute the upper arm 33. Exposed surfaces of the second end portions of the insert conductors 49e and 49f are positioned in a common plane with the mounting surface of the first radiating plate 39. The source terminals 37S and the gate terminals 37G of the power MOSFETs 37 that constitute the upper arm 33 are soldered to the exposed surfaces of the corresponding insert conductors 49e and 49f.

Respective insert conductors 49a, 49c, and 49e branch off and are exposed on the rear surfaces of the flange portions 44b at three positions that do not include the second circumferential end portion of the first circuit board 44. The exposed surfaces of these insert conductors 49a, 49c, and 49e are placed in close contact with and electrically connected to the first radiating plate segment 41, the third radiating plate segment 43, and the second radiating plate segment 42, respectively, by the fastening force of the mounting bolts 47.

Similarly, in the second circuit board 45, two of the insert conductors 50a and 50c are insert-molded into the second circuit board 45 such that first ends are exposed at first circumferential end portion front surface of the second circuit board 45, and second end portions are exposed on surfaces in regions of the base portion 45a that correspond to the source terminals 38S of the three power MOSFETs 38 that constitute the lower arms 32 and 36, respectively. Two of the insert conductors 50b and 50d are insert-molded into the second circuit board 45 such that first ends are exposed at the first circumferential end portion front surface of the second circuit board 45, and second end portions are exposed on surfaces in regions of the base portion 45a that correspond to the gate terminals 38G of the three power MOSFETs 38 that constitute the lower arms 32 and 36, respectively. The source terminals 38S and the gate terminals 38G of the three power MOSFETs 38 that constitute the lower arms 32 and 36 are soldered to the exposed surfaces of the corresponding insert conductors 50a through 50d.

Two of the insert conductors 50e and 50f are insert-molded into the second circuit board 45 such that first ends are exposed at a second circumferential end portion front surface of the second circuit board 45, and second end portions are exposed on surfaces in regions of the base portion 45a that correspond to the source terminals 38S and the gate terminals 38G, respectively, of the three power MOSFETs 38 that constitute the lower arm 34. The source terminals 38S and the gate terminals 38G of the three power MOSFETs 38 that constitute the lower arm 34 are soldered to the exposed surfaces of the corresponding insert conductors 50e and 50f.

Respective insert conductors 50a and 50c branch off and are exposed on the rear surfaces of the flange portions 45b at two positions at the first circumferential end portion of the second circuit board 45. In addition, an insert conductor 50e branches off and is exposed on the rear surfaces of the flange portions 45b at two positions at the second circumferential end portion of the second circuit board 45. The exposed surfaces of these insert conductors 50a, 50c, and 50e are placed in close contact with and electrically connected to the wall surface of the rear housing 3 by the fastening force of the mounting bolts 47.

The control apparatus 30 that is configured in this manner is fastened to the end surface of the rear housing 3 by the three mounting bolts 47 so as to be disposed in an approximate fan shape radially outside the shaft 5. The control circuit board 20, to which the control circuit 19 that includes elements such as custom ICs, drivers, etc., that control operation of the power MOSFETs 37 and 38 is mounted, and the brush holder 14, into which the field current control circuit 26 and the capacitor 22, etc., that control the field current to the field winding 7 are integrated, are disposed in an approximately fan-shaped notch portion of the control apparatus 30.

The drains of the respective power MOSFETs 37 that constitute the upper arms 31, 33, and 35 are electrically connected to the output terminal bolt 48 by means of the first radiating plate 39 and are also led into the brush holder 14 by means of the terminal 46. The source terminals 38S of the respective power MOSFETs 38 that constitute the lower arms 32, 34, and 36 are electrically connected to the rear housing 3 by means of the insert conductors 50a, 50c, and 50e.

The source terminals 37S of the respective power MOSFETs 37 that constitute the upper arms 31, 33, and 35 are electrically connected to the first through third radiating plate segments 41 through 43, respectively, by means of the exposed surfaces of the insert conductors 49a, 49c, and 49e that are exposed on the rear surfaces of the flange portions 44b of the first circuit board 44. Output wires (the alternating-current wiring 21) of the U-phase coil, the V-phase coil, and the W-phase coil of the armature winding 11 are soldered to the first through third radiating plate segments 41 through 43, respectively.

The source terminals 37S and 38S and the gate terminals 37G and 38G of the power MOSFETs 37 and 38 are electrically connected to the control circuit 19 by means of the portions of the insert conductors 49a through 49f and 50a through 50f that are exposed at the circumferential end portions of the first and second circuit boards 44 and 45.

Now, when the fan 12 at the rear end is driven to rotate together with the rotation of the rotor 6, cooling airflows are sucked through the air intake apertures 18a into the cover 18. The cooling airflows that have been sucked into the cover 18 then flow in through the air intake apertures 3b into the rear housing 3, are deflected centrifugally by the fan 12, and are discharged through the air discharge apertures 3c.

Here, the cooling airflows flow as indicated by arrows Fa through Fd in FIG. 1. Specifically, as indicated by the arrow Fa, a cooling airflow that has flowed in through the air intake apertures 18a that are disposed through the end surface of the cover 18 flows radially inward over the front surface of the base portion 39a of the first radiating plate 39, and flows toward the rear housing 3 by passing between the first radiating plate 39 and the shaft 5. As indicated by the arrow Fb, a portion of the cooling airflow that has flowed in through the air intake apertures 18a that are disposed through the end surface of the cover 18 flows toward the rear housing 3 by flowing between the first radiating plate 39 and the second radiating plate 40.

In addition, as indicated by the arrow Fc, a cooling airflow that has flowed in through the air intake apertures 18a that are disposed through the side surface of the cover 18 flows toward the rear housing 3 by flowing between the first radiating plate 39 and the second radiating plate 40. As indicated by the arrow Fd, a portion of the cooling airflow that has flowed in through the air intake apertures 18a that are disposed through the side surface of the cover 18 flows radially inward by flowing between the second radiating plate 40 and the wall surface of the rear housing 3. The cooling airflows that have flowed through the respective ventilation channels flow into the rear housing 3 through the air intake apertures 3b, are deflected centrifugally by the fan 12, and are discharged through the air discharge apertures 3c. The power MOSFETs 37 and 38, the first and second radiating plates 39 and 40, and the control circuit board 20, as well as the rear-end coil ends of the armature winding 11 and the air discharge aperture ribs 3a, are thereby cooled.

When the fan 12 at the front end is driven to rotate, cooling airflows are sucked in through the air intake apertures 2b into the front housing 2. The cooling airflows that have been sucked into the front housing 2 are deflected centrifugally by the fan 12, and are discharged through the air discharge apertures 2c. Front-end coil ends of the armature winding 11 and the air discharge aperture ribs 2a are thereby cooled.

According to Embodiment 1, because the first radiating plate 39, the first circuit board 44, the second radiating plate 40, and the second circuit board 45 are disposed in a single layer in an axial direction of the shaft 5, axial dimensions of the control apparatus 30 can be reduced, enabling reductions in the size of the automotive electric motor-generator 1.

Because the axial dimensions of the control apparatus 30 can be reduced, sufficient cooling airflow ventilation channels can be ensured even within constraints on limited axial dimensions in the automotive generator-motor 1, ensuring sufficient cooling of the first radiating plate 39 and the second radiating plate 40 to which are mounted the power MOSFETs 37 and 38, which require cooling the most. Desired surface area and volume can be ensured in the first and second radiating plates 39 and 40 within the limited axial dimensions by disposing radiating fins so as to extend axially from the first radiating plate 39 and the second radiating plate 40, etc.

With regard to radial flow of the cooling airflows, because the cooling airflows flow over two surfaces of the first radiating plate 39 and the second radiating plate 40 without interfering with each other, effective radiating is performed.

Because the cooling airflows flow over the two surfaces of the first radiating plate 39, between the first radiating plate 39 and the second radiating plate 40, and also over the two surfaces of the second radiating plate 40 without being stopped, ventilation resistance is reduced, improving cooling and also enabling wind noise to be reduced.

Because the ventilating apertures 51a and 51b are formed so as to pass through the first radiating plate 39 and the second radiating plate 40, cooling airflows that flow axially and radially flow through the ventilating apertures 51a and 51b. Thus, because ventilation resistance is reduced, airflow rate can be increased, and wind noise can be reduced.

Because a space is formed between the first radiating plate 39 and the second radiating plate 40, which have different electric potentials, and the two are also partitioned off by the base portion 44a of the first circuit board 44, i.e., an insulating member, foreign matter, and electrically-conductive deposits, etc., will not accumulate, ensuring highly-reliable insulation and also preventing the occurrence of leakage currents between the different electric potentials, and galvanic corrosion, etc.

Because the output terminal bolt 48 projects axially outward from a rear-end end portion of the automotive electric motor-generator 1, connecting wiring with the external components such as the battery 23, etc., is facilitated if space is present rearward in a vehicle.

Because the second radiating plate 40 is positioned radially outside the first radiating plate 39, electrical connection with the armature winding 11 of the stator 9 is facilitated.

Because the first and second radiating plates 39 and 40 and the first and second circuit boards 44 and 45 are fastened integrally onto the end surface of the rear housing 3 by the mounting bolts 47 in an assembled state, highly-reliable vibration resistance is achieved.

The second radiating plate 40 is fixed to the end surface of the rear housing 3 by means of the flange portions 45b of the second circuit board 45. Thus, because heat from the power MOSFETs 38 is conducted to the rear housing 3 by means of the second radiating plate 40 and the flange portions 45b, the power MOSFETs 38 can be cooled effectively.

The front surface of the base portion 45a is positioned in a common plane with the mounting surfaces of the first through third radiating plate segments 41 through 43, the second end portions of the insert conductors 50a through 50f are exposed on the front surface of the base portion 45a at regions that correspond to the source terminals 38S and the gate terminals 38G of the power MOSFETs 38, and the source terminals 38S and the gate terminals 38G of the power MOSFETs 38 are soldered to the exposed surfaces of the corresponding insert conductors 50a through 50f. Thus, the source terminals 38S and the gate terminals 38G of the power MOSFETs 38 and the insert conductors 50a through 50f can be connected directly and simply, making reductions in size possible.

The insert conductors 50a, 50c, and 50e that are electrically connected to the source terminals 38S of the power MOSFETs 38 are insert-molded into the second circuit board 45 so as to be exposed on the rear surfaces of the flange portions 45b, and are placed in contact with the end surface of the rear housing 3 by the fastening force of the mounting bolts 47. Thus, connecting electrode members that connect the insert conductors 50a, 50c, and 50e and the rear housing 3 are no longer necessary, reducing the number of parts proportionately, and enabling weight, and cost, etc., to be reduced, and also simplifying connecting processes. In addition, because the rear housing 3 is used as ground for the automotive electric motor-generator 1, electrode members that have negative potential are no longer necessary, reducing the number of parts, and enabling weight, and cost, etc., to be reduced. Because the source terminals 38S of the power MOSFETs 38 are connected to the rear housing 3 by means of the insert conductors 50a, 50c, and 50e, heat from the power MOSFETs 38 is transferred to the low-temperature rear housing 3 directly without air intervening, enabling temperature increases in the power MOSFETs 38 to be suppressed.

Now, because the flange portion 39b for mounting the output terminal bolt 48 is disposed so as to extend radially outward from the base portion 39a of the first radiating plate 39 so as to be positioned on the second radiating plate 40, the heat radiating area of the first radiating plate 39 is reduced. Thus, it is desirable to make the radial width of the base portion 39a of the first radiating plate 39 greater than the radial width of the base portion of the second radiating plate 40. Because the heat radiating area of the first radiating plate 39 is thereby increased, cooling of the first radiating plate 39 is prevented from deteriorating due to the output terminal bolt 48 being mounted. Thus, the cooling efficiency of the first radiating plate 39 becomes approximately equal to the cooling efficiency of the second radiating plate 40, enabling the power MOSFETs 37 and 38 that are mounted to the first and second radiating plates 39 and 40 to be cooled to approximately identical temperatures. In addition, because rigidity of the first radiating plate 39 is increased, mechanical strength against external forces from external connecting wires is improved. Thus, even if external forces when external components such as the battery 23, etc., are connected to the output terminal bolt 48, or stresses that result from vibrating external forces, etc., act on the first radiating plate 39, situations in which the first radiating plate 39 might break are prevented.

Embodiment 2

Figure 9:
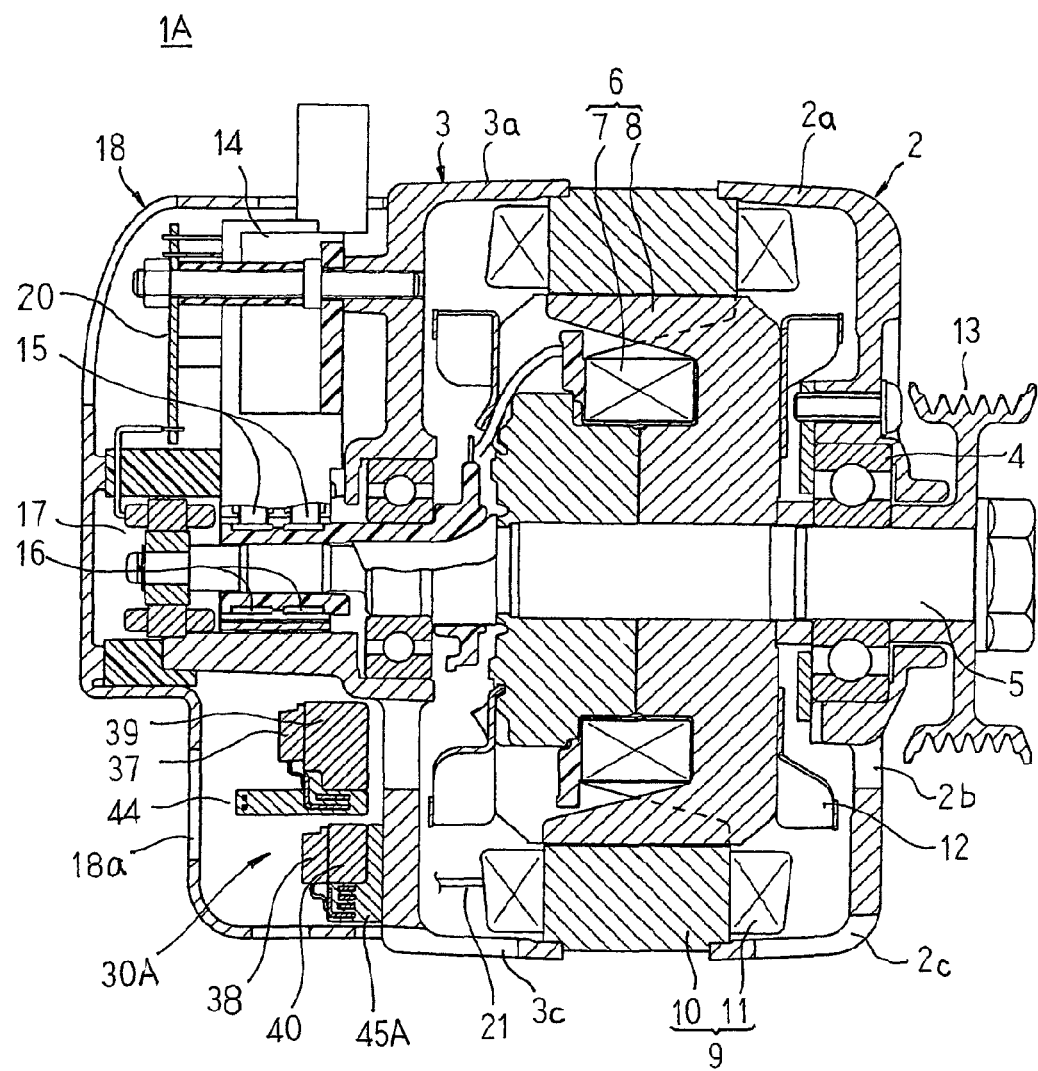
FIG. 9 is a longitudinal section that shows an overall configuration of an automotive electric motor-generator according to Embodiment 2 of the present invention.
Figure 10:
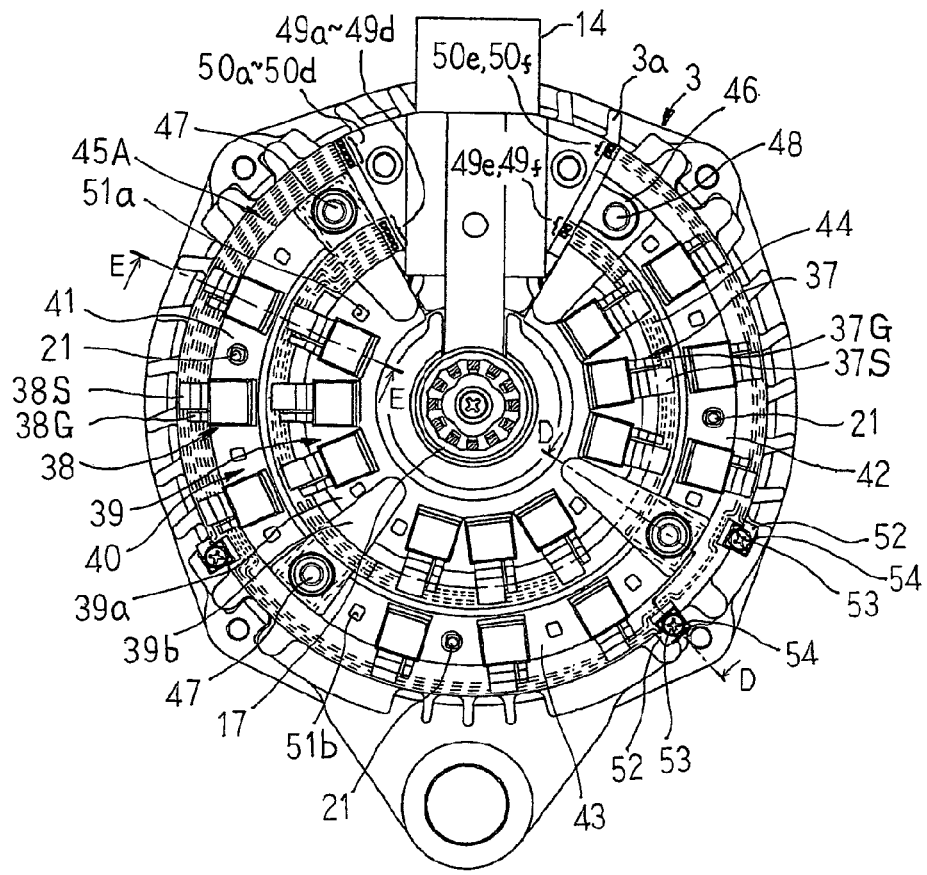
FIG. 10 is a rear-end end elevation, as seen from the rear side, of the automotive electric motor-generator according to Embodiment 2 of the present invention in a state in which a cover has been removed.
Figure 11:
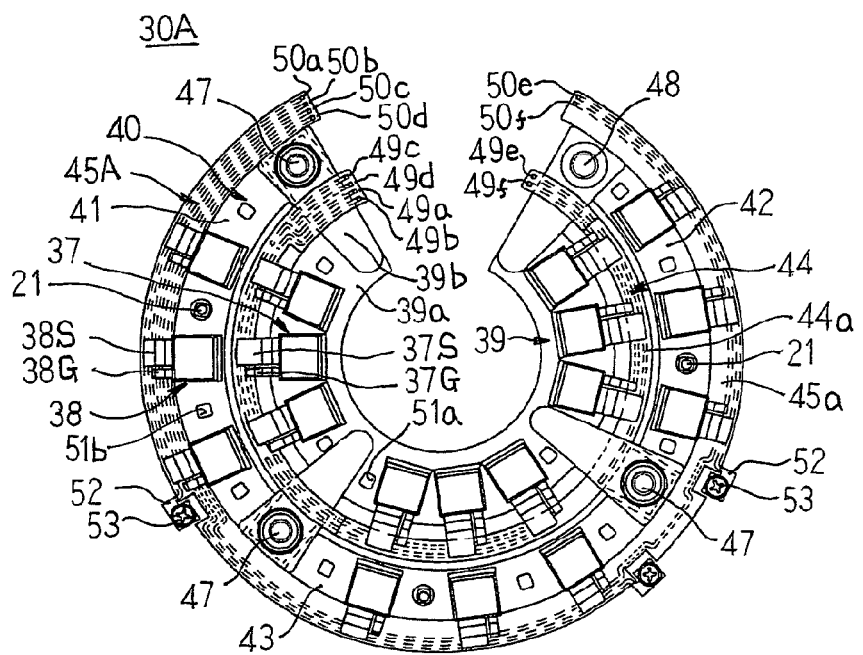
FIG. 11 is a plan that shows a control apparatus in the automotive electric motor-generator according to Embodiment 2 of the present invention.
Figure 12:
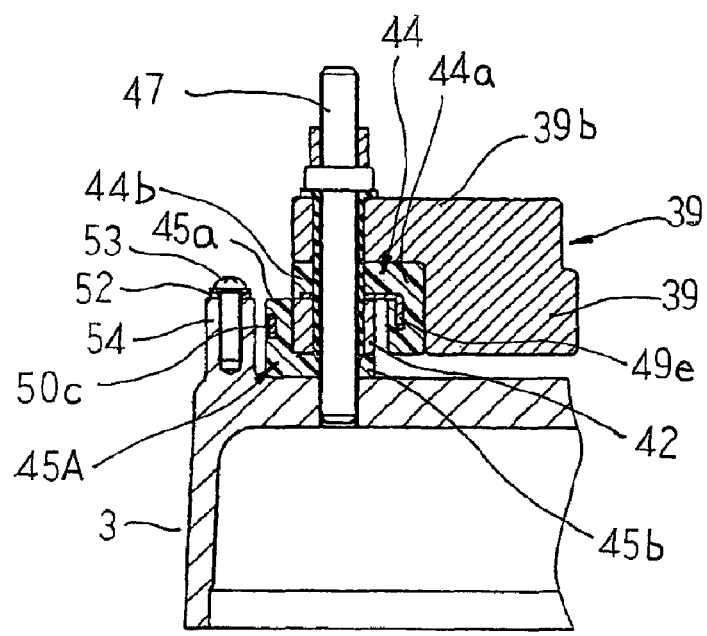
FIG. 12 is a cross section that is taken along line D-D in FIG. 10 so as to be viewed in the direction of the arrows.
Figure 13:
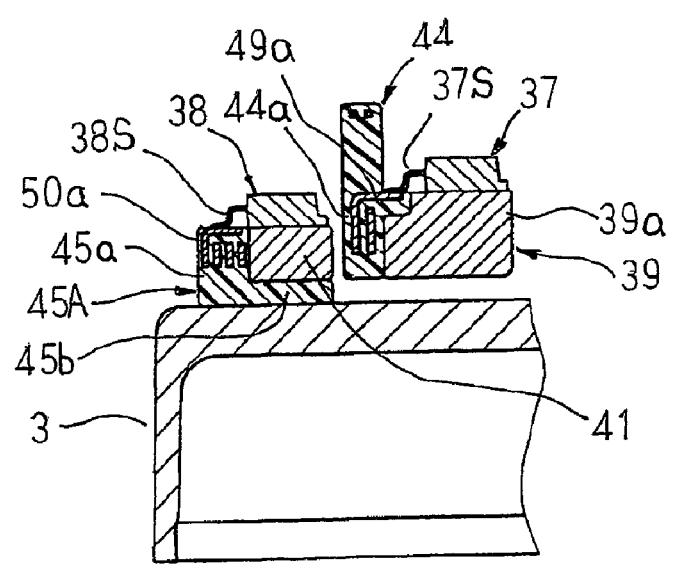
FIG. 13 is a cross section that is taken along line E-E in FIG. 10 so as to be viewed in the direction of the arrows.

FIG. 9 is a longitudinal section that shows an overall configuration of an automotive electric motor-generator according to Embodiment 2 of the present invention, FIG. 10 is a rear-end end elevation, as seen from the rear side, of the automotive electric motor-generator according to Embodiment 2 of the present invention in a state in which a cover has been removed, FIG. 11 is a plan that shows a control apparatus in the automotive electric motor-generator according to Embodiment 2 of the present invention, FIG. 12 is a cross section that is taken along line D-D in FIG. 10 so as to be viewed in the direction of the arrows, and FIG. 13 is a cross section that is taken along line E-E in FIG. 10 so as to be viewed in the direction of the arrows.

In FIGS. 9 through 13, a second circuit board 45A in a control apparatus 30A is formed so as to have an approximate fan shape that has an L-shaped cross section that is constituted by a base portion 45a and a flange portion 45b. First through third radiating plate segments 41 through 43 that constitute a second radiating plate 40 are arrayed in an approximate fan shape, and are molded integrally with a second circuit board 45A such that front surfaces and inner wall surfaces of each are exposed. The front surfaces of the first through third radiating plate segments 41 through 43 that have been arrayed in an approximate fan shape are positioned level with a front surface of the base portion 45a of the second circuit board 45A, and the rear surfaces of the first through third radiating plate segments 41 through 43 are covered by the flange portion 45b.

Six insert conductors 50a through 50f are also insert-molded into the second circuit board 45A, but instead of being exposed on a rear surface of the flange portion 45b, portions of the insert conductors 50a, 50c, and 50e extend radially outward from the base portion 45a in a vicinity of connecting protrusion portions 54 that are disposed so as to protrude from an end surface of a rear housing 3. Projecting portions 52 of the insert conductors 50a, 50c, and 50e are respectively fastened to the connecting protrusion portions 54 of the rear housing 3 by screws 53.

Moreover, the rest of this embodiment is configured in a similar manner to Embodiment 1 above.

In this automotive electric motor-generator 1A, the second circuit board 45A and the first through third radiating plate segments 41 through 43 are disposed on the rear housing 3 in an approximate fan shape so as to be centered around the central axis of the rear housing 3. The first circuit board 44 is disposed such that the flange portions 44b face the flange portion 45b of the second circuit board 45A across the first through third radiating plate segments 41 through 43. In addition, the first radiating plate 39 is disposed such that the flange portions 39b are placed on the flange portions 44b of the first circuit board 44 and the base portion 39a is in close proximity to an inner circumferential side of the base portion 44a of the first circuit board 44.

The flange portions 39b at three positions that are not at a second circumferential end of the first radiating plate 39, the flange portions 44b at three positions that are not at a second circumferential end portion of the first circuit board 44, first circumferential ends of each of the first through third radiating plate segments 41 through 43, and the flange portion 45b of the second circuit board 45A are stacked axially on each other and securely fastened to the rear housing 3 by mounting bolts 47. In addition, the output terminal bolt 48 is mounted so as to pass through the flange portion 39b at the second circumferential end of the first radiating plate 39 from a rear surface side and project axially outward through the cover 18. The projecting portions 52 of the insert conductors 50a, 50c, and 50e are fastened to the connecting protrusion portions 54 of the rear housing 3 by the screws 53. A terminal 46 is interposed between a head portion of the output terminal bolt 48 and the flange portion 39b. In addition, although not shown, the flange portion 44b of the first circuit board 44 is interposed between the output terminal bolt 48 and the third radiating plate segment 43 such that the two are in an insulated state.

In an automotive electric motor-generator 1A that is configured in this manner, the flange portion 45b is placed in close contact with the end surface of the rear housing 3 around an entire circumferential region of the second circuit board 45A, and the control apparatus 30A is cooled by heat transfer through the flange portion 45b of the second circuit board 45A to the rear housing 3, in addition to the cooling airflows Fa through Fc that are shown in FIG. 1.

In Embodiment 2, because the first radiating plate 39, the first circuit board 44, the second radiating plate 40, and the second circuit board 45A are also disposed in a single layer in an axial direction of the shaft 5, the axial dimensions of the control apparatus 30A can be reduced, enabling similar effects to those in Embodiment 1 above to be achieved.

Because the first radiating plate 39, the first circuit board 44, the second radiating plate 40, and the second circuit board 45A are disposed in a single layer in an axial direction of the shaft 5 in a similar manner to Embodiment 1 above, ventilation resistance is also reduced, increasing the cooling airflow rate. Heat from the power MOSFETs 38 is transferred from the second radiating plate 40 to the rear housing 3 by means of the flange portion 45b of the second circuit board 45A, and is cooled by the cooling airflows by means of the air discharge aperture ribs 3a. Thus, because the flow rate of the cooling airflows is increased and the rate of heat transfer to the rear housing 3 is also increased, the rate of heat exchange from the rear housing 3 is increased by synergistic reinforcement of the two, suppressing temperature increases in the control apparatus 30A.

Because the second radiating plate 40 (the first through third radiating plate segments 41 through 43) and the second circuit board 45A are integrated by molding, highly-reliable vibration resistance can be achieved, and the number of parts is also reduced, simplifying assembly.

The flange portion 45b of the circuit board 45A is formed so as to have an approximate fan shape. Thus, heat from the power MOSFETs 38 is transferred to the low-temperature rear housing 3 directly through the second radiating plate 40 and the flange portion 45b, suppressing temperature increases in the power MOSFETs 38. The first radiating plate 39, the second radiating plate 40, and the first and second circuit boards 44 and 45A are also securely fastened such that a wide area of the approximately fan-shaped flange portion 45b is placed in contact with the end surface of the rear housing 3, achieving even more highly-reliable vibration resistance.

Moreover, in conventional techniques, the drains and sources (grounds) of the lower arms are not in a common plane, spatially requiring connecting members for connection and leading to increases in size. However, in Embodiment 2, the projecting portions 52 of the insert conductors 50a, 50c, and 50e extend outward from the base portion 45a in the vicinity of the connecting protrusion portions 54 of the rear housing 3 at an approximately uniform height. Thus, the lengths of the projecting portions 52 of the insert conductors 50a, 50c, and 50e are shortened, facilitating connection between the projecting portions 52 and the connecting protrusion portions 54. In other words, according to Embodiment 2, large connecting members that were required in conventional techniques are no longer necessary, enabling reductions in size.

Embodiment 3

Figure 14:
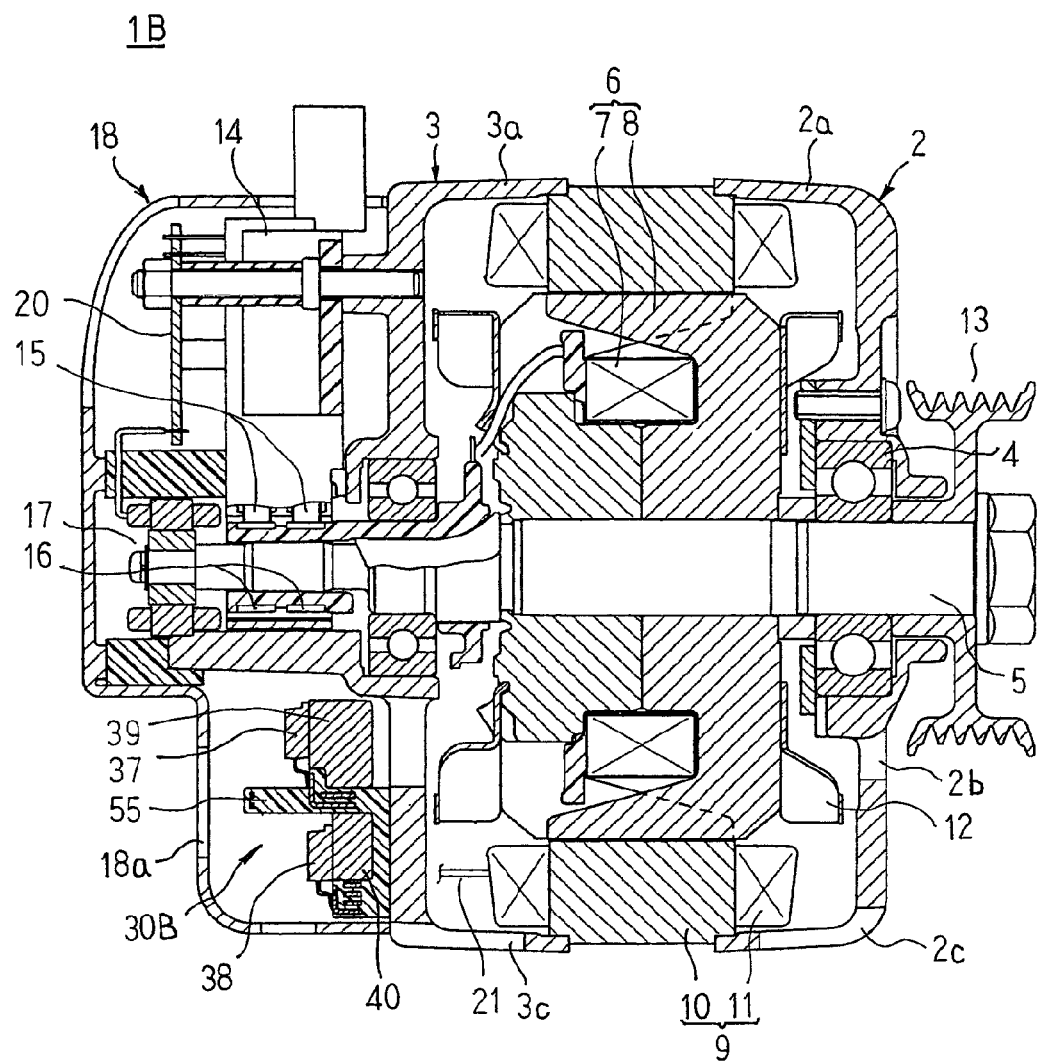
FIG. 14 is a longitudinal section that shows an overall configuration of an automotive electric motor-generator according to Embodiment 3 of the present invention.
Figure 15:
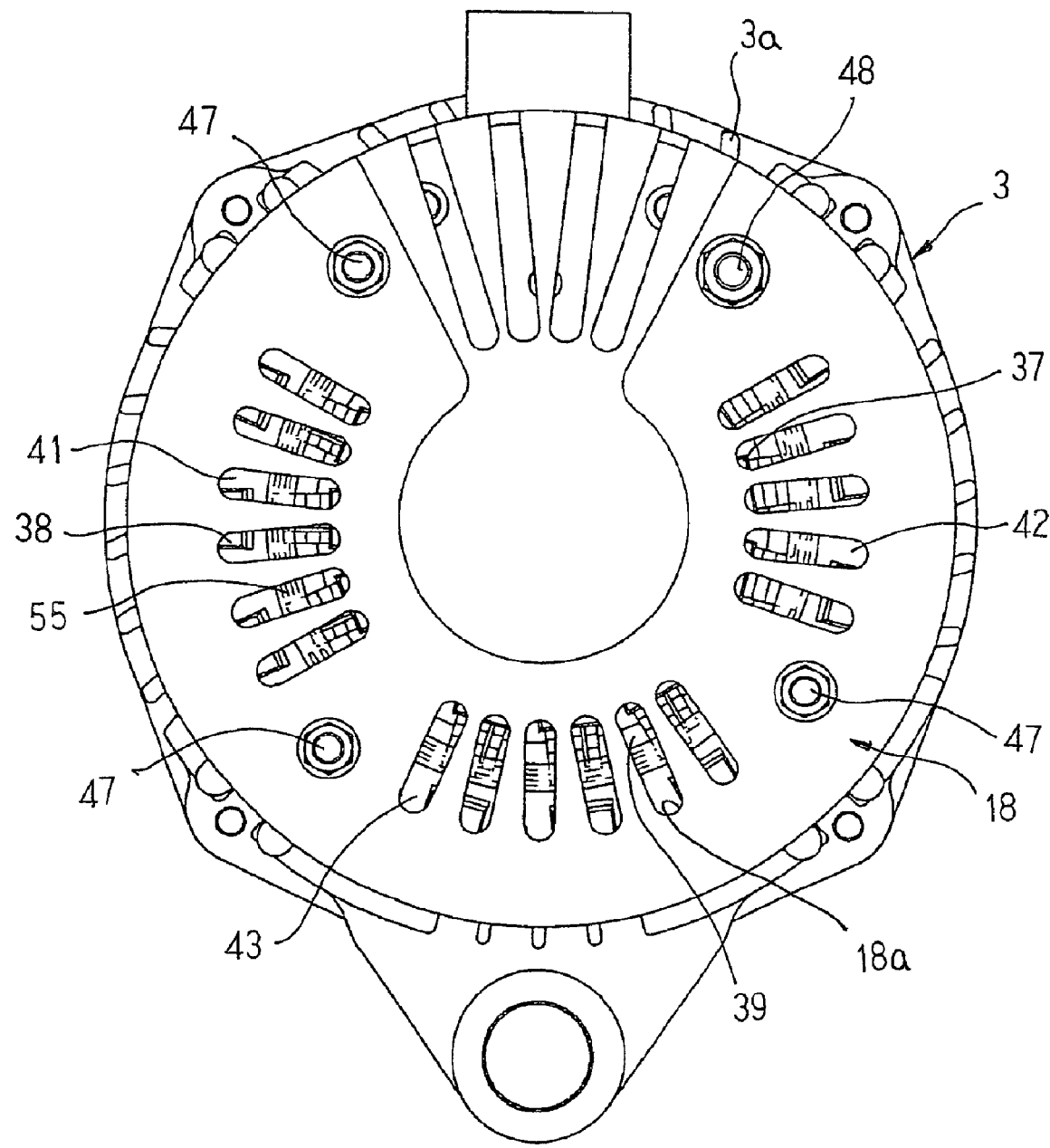
FIG. 15 is a rear-end end elevation, as seen from the rear side, of the automotive electric motor-generator according to Embodiment 3 of the present invention.
Figure 16:
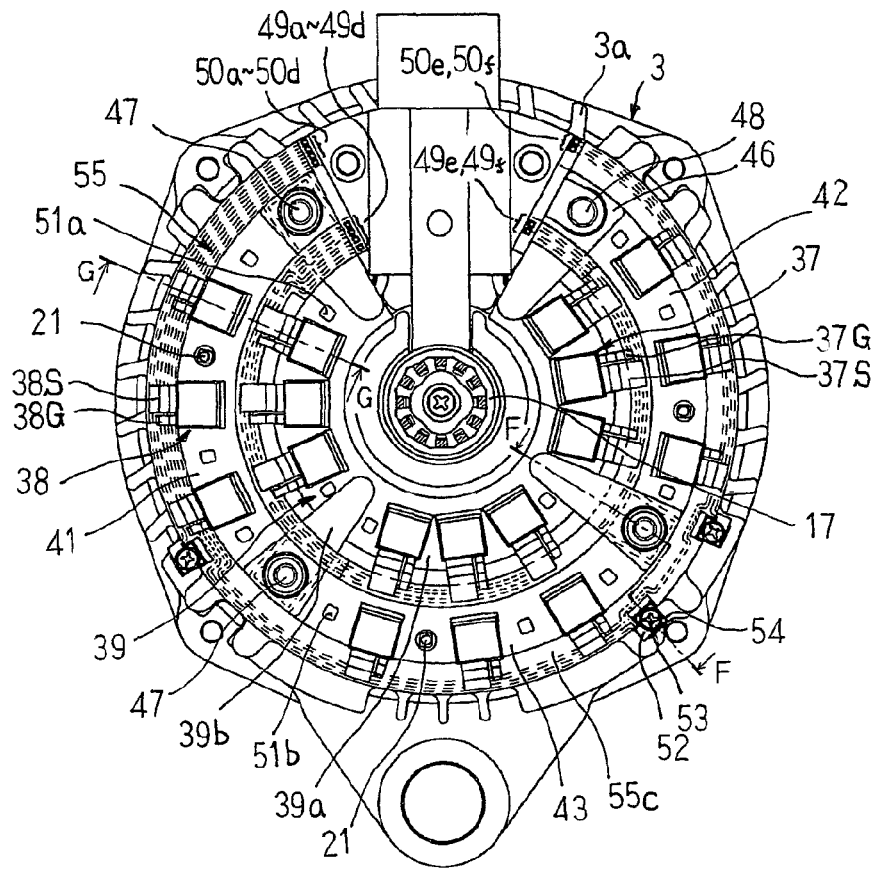
FIG. 16 is a rear-end end elevation, as seen from the rear side, of the automotive electric motor-generator according to Embodiment 3 of the present invention in a state in which a cover has been removed.
Figure 17:
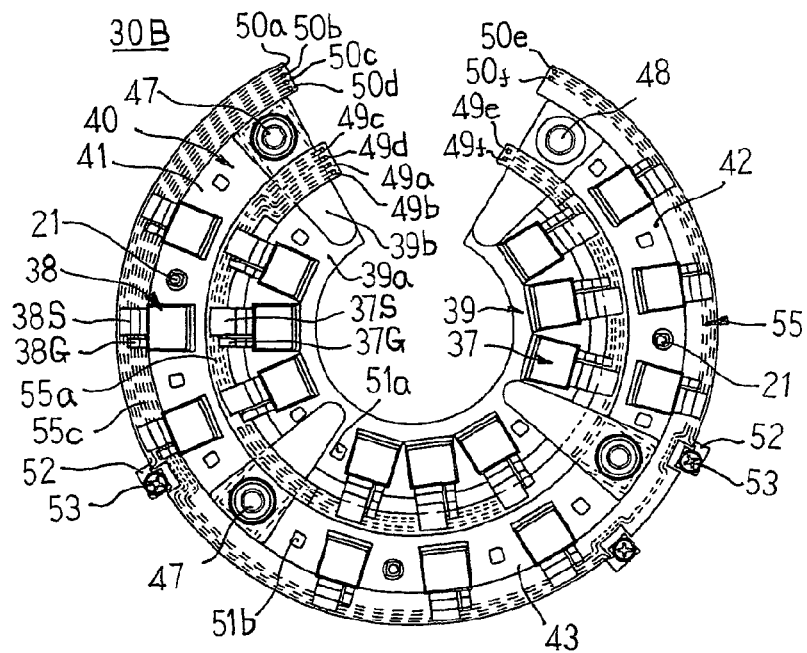
FIG. 17 is a plan that shows a control apparatus in the automotive electric motor-generator according to Embodiment 3 of the present invention.
Figure 18:
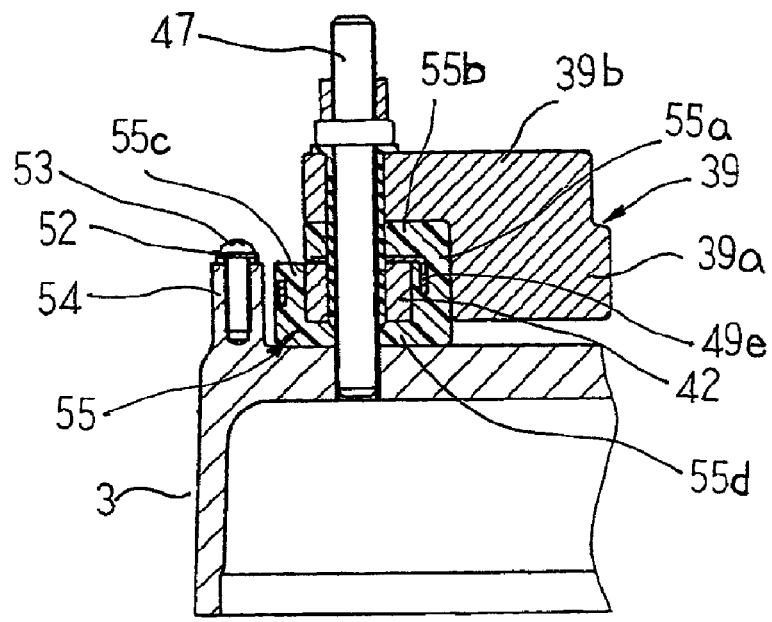
FIG. 18 is a cross section that is taken along line F-F in FIG. 16 so as to be viewed in the direction of the arrows.
Figure 19:
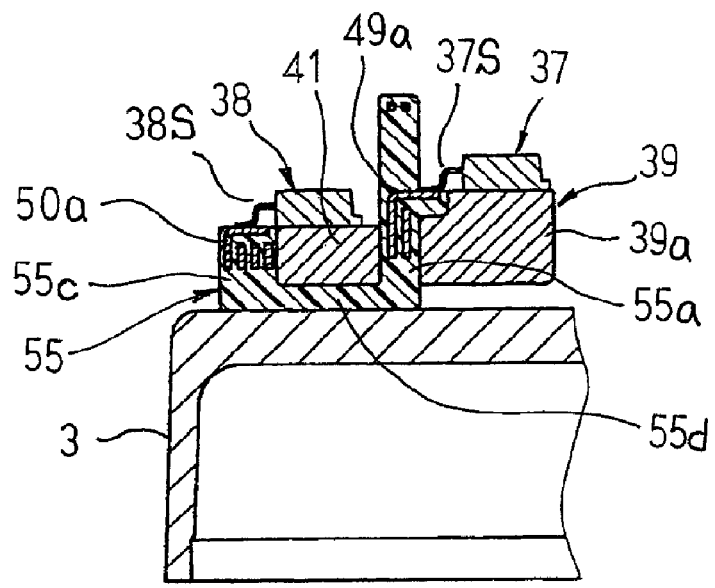
FIG. 19 is a cross section that is taken along line G-G in FIG. 16 so as to be viewed in the direction of the arrows.

FIG. 14 is a longitudinal section that shows an overall configuration of an automotive electric motor-generator according to Embodiment 3 of the present invention, FIG. 15 is a rear-end end elevation, as seen from the rear side, of the automotive electric motor-generator according to Embodiment 3 of the present invention, FIG. 16 is a rear-end end elevation, as seen from the rear side, of the automotive electric motor-generator according to Embodiment 3 of the present invention in a state in which a cover has been removed, FIG. 17 is a plan that shows a control apparatus in the automotive electric motor-generator according to Embodiment 3 of the present invention, FIG. 18 is a cross section that is taken along line F-F in FIG. 16 so as to be viewed in the direction of the arrows, and FIG. 19 is a cross section that is taken along line G-G in FIG. 16 so as to be viewed in the direction of the arrows.

In FIGS. 14 through 19, first through third radiating plate segments 41 through 43 that constitute a second radiating plate 40 in a control apparatus 30B are arrayed in an approximate fan shape (a C shape) around an outer circumference of a first radiating plate 39, and are molded integrally into a circuit board 55 together with the first radiating plate 39. This circuit board 55 is formed so as to have an approximate fan shape (a C shape) that has: a base portion 55a that has an approximate fan shape (a C shape) that is parallel to an outer circumference of a base portion 39a of the first radiating plate 39; flange portions 55b that are disposed so as to extend radially outward from an outer circumferential surface of the base portion 55a at four positions that include two circumferential end portions of the base portion 55a and portions that divide the base portion 55a into three equal sections circumferentially; a base portion 55c that has an approximate fan shape (a C shape) that is parallel to an outer circumference of the second radiating plate 40; and a flange portion 55d that is disposed so as to extend radially inward from a rear surface of the base portion 55c and is linked to a rear surface of the base portion 55a. The base portions 55a and 55c and the flange portions 55b and 55d correspond to an insulating resin.

Outer circumferential wall surfaces of the first through third radiating plate segments 41 through 43 are covered by the base portion 55c, rear surfaces are covered by the flange portion 55d, inner circumferential wall surfaces are covered by the base portion 55a, and front surfaces of each are exposed so as to be positioned in a common plane with the base portions 55c. The flange portions 55b extend outward from the base portion 55a onto the front surfaces of the first through third radiating plate segments 41 through 43 at the four circumferential portions. In addition, an outer circumferential wall surface of the first radiating plate 39 is covered by the base portion 55a. A first circuit board 44 and a second circuit board 45A are thereby configured integrally into the circuit board 55.

Moreover, the rest of this embodiment is configured in a similar manner to Embodiment 2 above.

In a similar manner to Embodiment 2 above, six insert conductors 49a through 49f are insert-molded into portions of this control apparatus 30B that include the base portion 55a and the flange portions 55b, and six insert conductors 50a through 50f are insert-molded into portions that include the base portion 55c and the flange portion 55d.

In this automotive electric motor-generator 1B, the first and second radiating plates 39 and 40 that have been integrated by the circuit board 55 are disposed on the rear housing 3 in an approximate fan shape so as to be centered around the central axis of the rear housing 3. The flange portions 39b at three positions that are not at a second circumferential end of the first radiating plate 39, the flange portions 55b at three positions that are not at a second circumferential end portion of the circuit board 55, first circumferential ends of each of the first through third radiating plate segments 41 through 43, and the flange portion 55d of the circuit board 55 are each securely fastened to the rear housing 3 by mounting bolts 47. In addition, the output terminal bolt 48 is mounted so as to pass through the flange portion 39b at the second circumferential end of the first radiating plate 39 from a rear surface side and project axially outward through the cover 18. The projecting portions 52 of the insert conductors 50a, 50c, and 50e are fastened to the connecting protrusion portions 54 of the rear housing 3 by the screws 53. A terminal 46 is interposed between a head portion of the output terminal bolt 48 and the flange portion 39b.

In an automotive electric motor-generator 1B that is configured in this manner, the control apparatus 30B is cooled by heat transfer through the flange portion 55d of the circuit board 55 to the rear housing 3, in addition to the cooling airflows Fa and Fc that are shown in FIG. 1.

In Embodiment 3, because the first radiating plate 39, the circuit board 55, and the second radiating plate 40 are also disposed in a single layer in an axial direction of the shaft 5, similar effects to those in Embodiment 2 above can be achieved.

Because the first radiating plate 39 and the second radiating plate 40 (the first through third radiating plate segments 41 through 43) are integrated by being molded together with the circuit board 55, highly-reliable vibration resistance can be achieved, and the number of parts is also reduced, simplifying assembly. In addition, heat from the power MOSFETs 37 and 38 is radiated by means of the insulating resin of the circuit board 55, improving thermal balance.

The first radiating plate 39, the second radiating plate 40, and the circuit board 55 are also securely fastened such that a wide area of the approximately fan-shaped flange portion 55d is placed in contact with the end surface of the rear housing 3, achieving even more highly-reliable vibration resistance.

Moreover, in Embodiments 1 through 3 above, the upper arms 31, 33, and 35 and the lower arms 32, 34, and 36 are explained as being each configured by connecting three power MOSFETs 37 or 38 in parallel, but the number of power MOSFETs 37 or 38 in parallel is not limited to three, and can be appropriately set so as to correspond to the required output capacity of the automotive electric motor-generator and to the maximum capacity and permissible temperature of the semiconductor elements, etc., and the number of power MOSFETs 37 or 38 in parallel may also be two or four, for example, or single power MOSFETs 37 or 38 may also be used.

In Embodiments 1 through 3 above, the output terminal bolt 48 is mounted so as to project axially outward, but an output terminal bolt may also be mounted so as to project radially outward.

Embodiment 4

Figure 20:
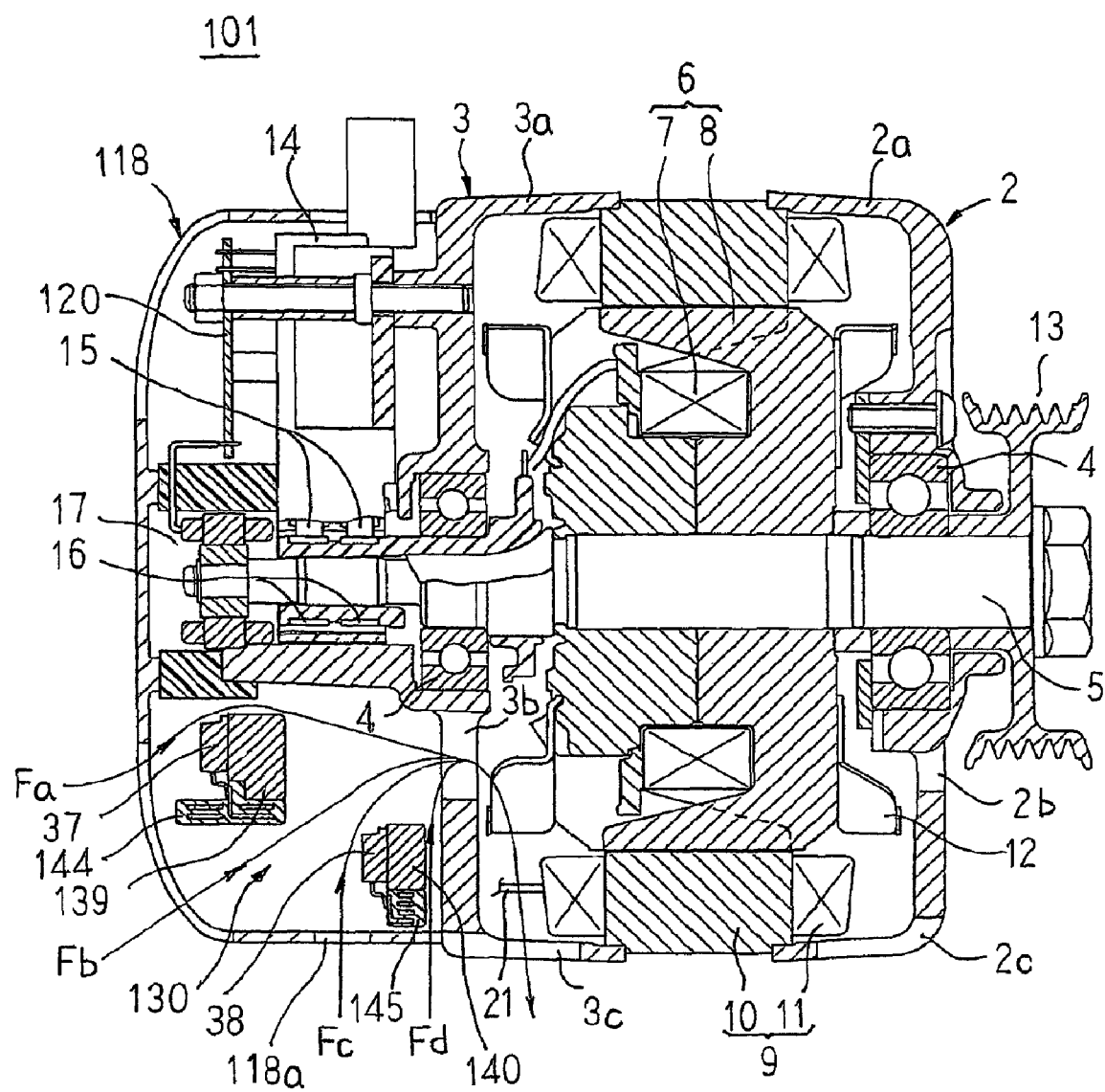
FIG. 20 is a longitudinal section that shows an overall configuration of an automotive electric motor-generator according to Embodiment 4 of the present invention.
Figure 21:
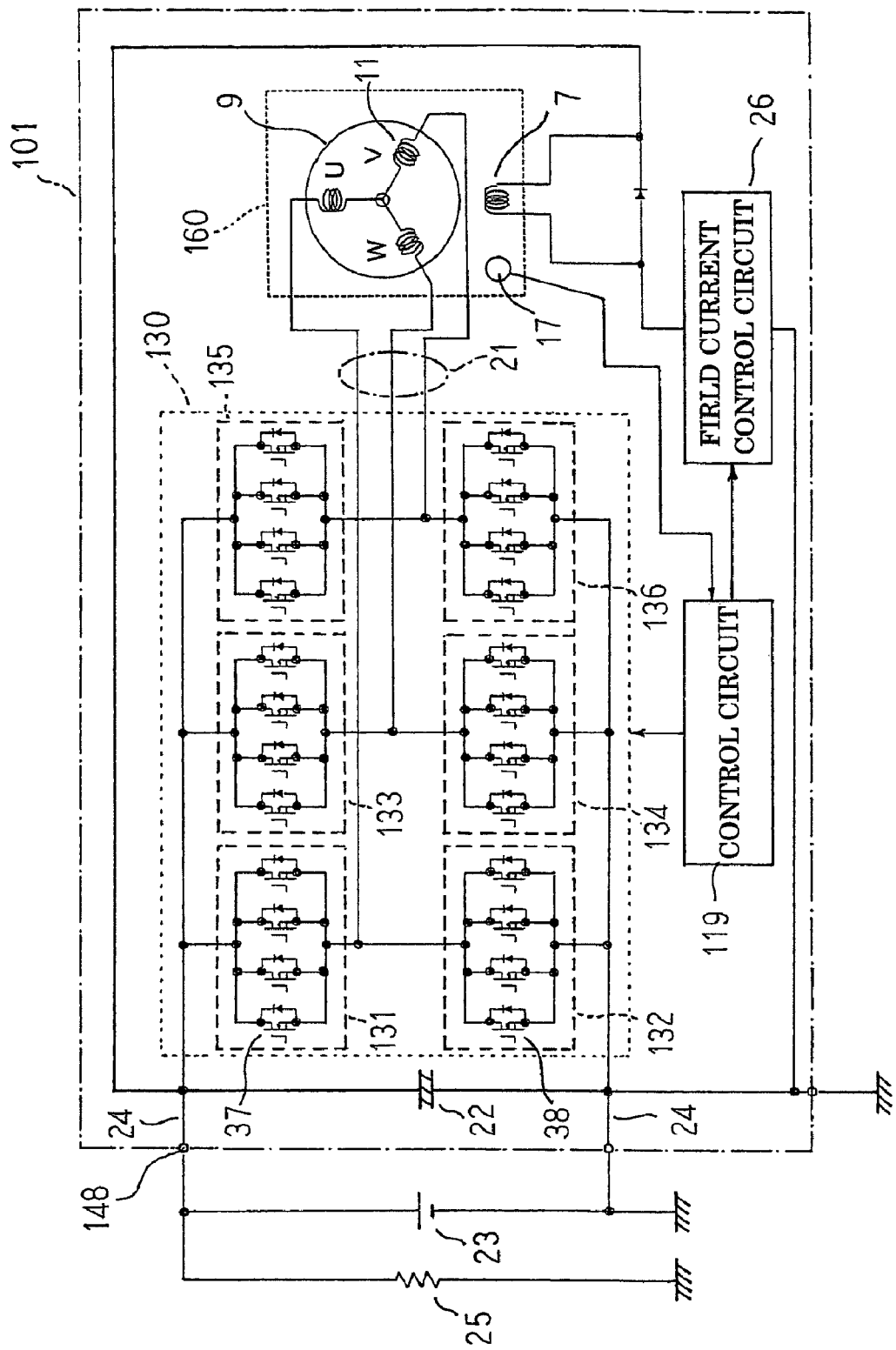
FIG. 21 is a circuit diagram for explaining operation of the automotive electric motor-generator according to Embodiment 4 of the present invention.
Figure 22:
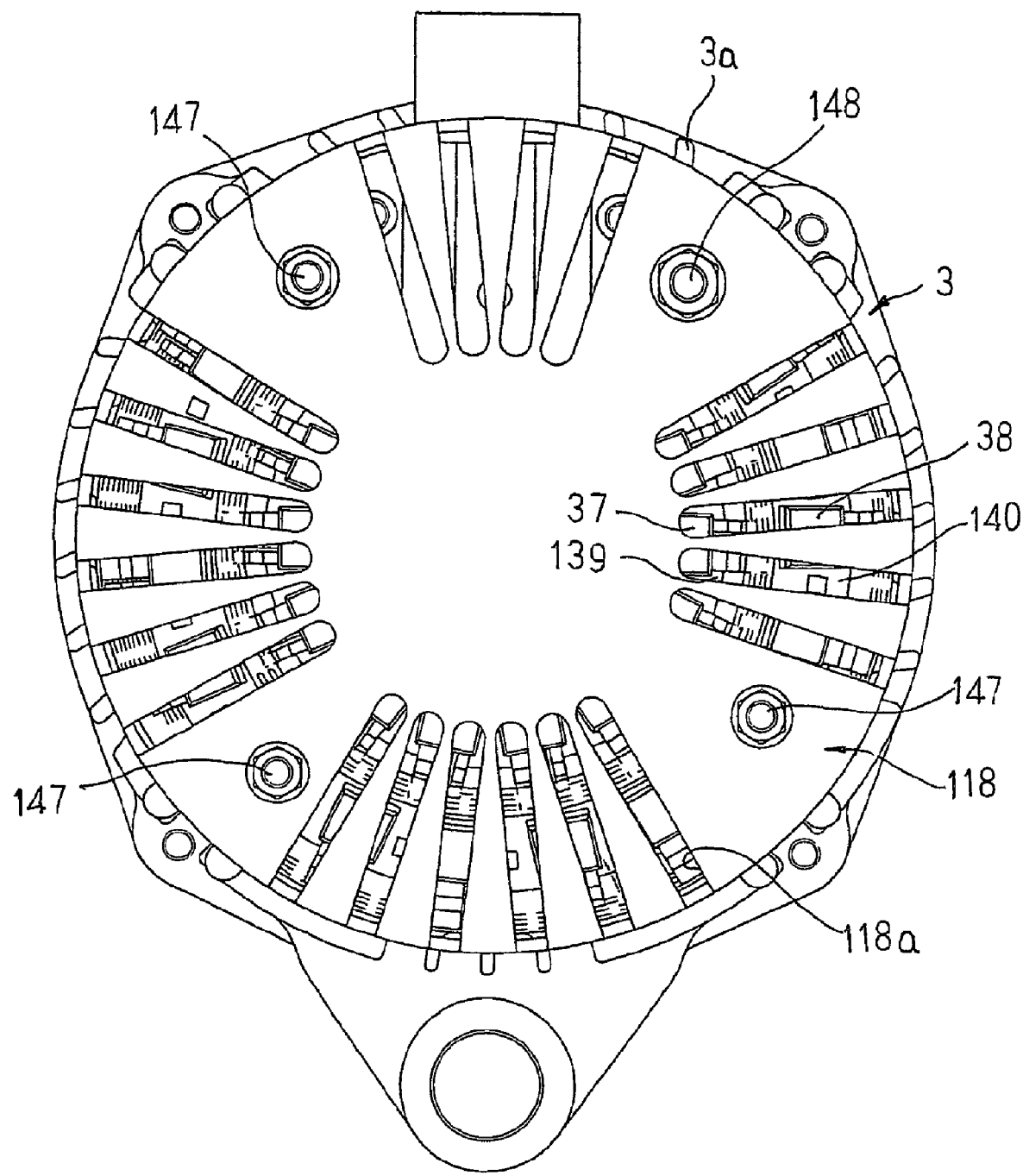
FIG. 22 is a rear-end end elevation, as seen from the rear side, of the automotive electric motor-generator according to Embodiment 4 of the present invention.
Figure 23:
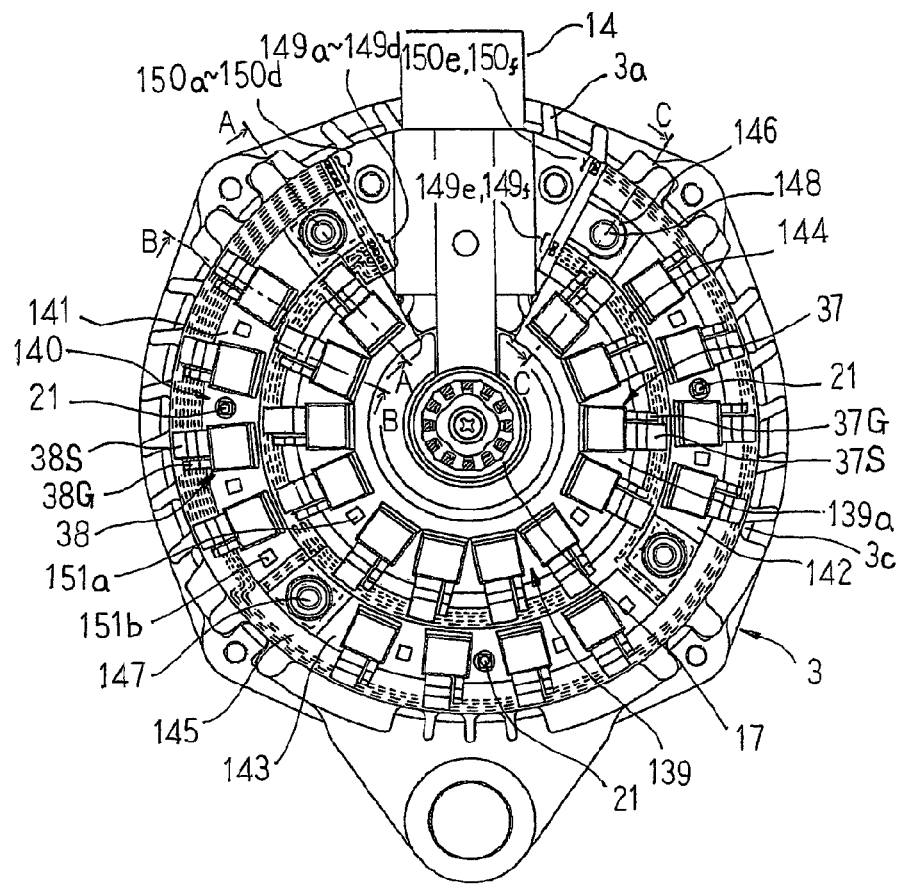
FIG. 23 is a rear-end end elevation, as seen from the rear side, of the automotive electric motor-generator according to Embodiment 4 of the present invention in a state in which a cover has been removed.
Figure 24:
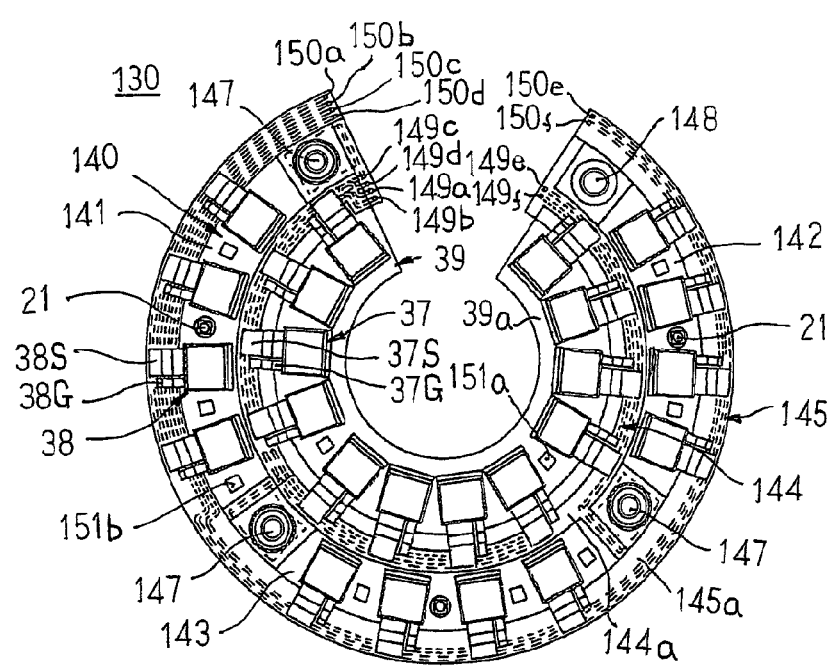
FIG. 24 is a plan that shows a control apparatus in the automotive electric motor-generator according to Embodiment 4 of the present invention.
Figure 25:
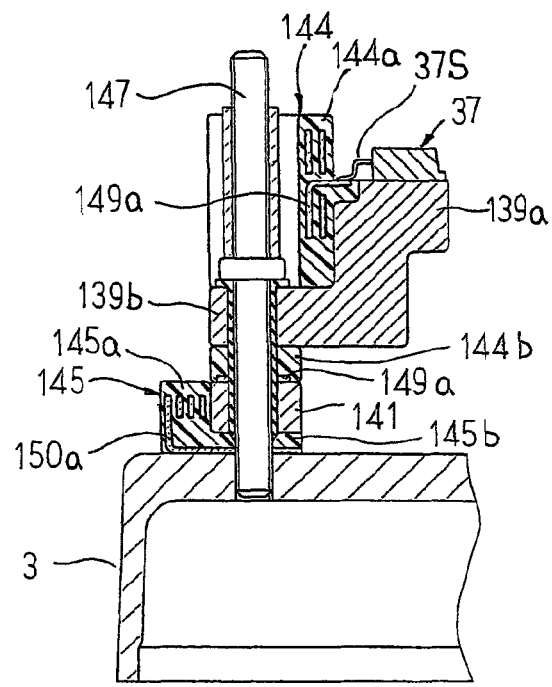
FIG. 25 is a cross section that is taken along line A-A in FIG. 23 so as to be viewed in the direction of the arrows.
Figure 26:
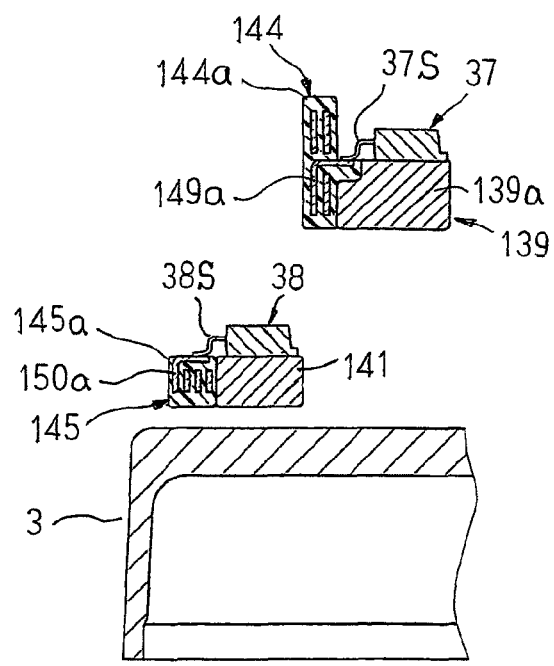
FIG. 26 is a cross section that is taken along line B-B in FIG. 23 so as to be viewed in the direction of the arrows.
Figure 27:
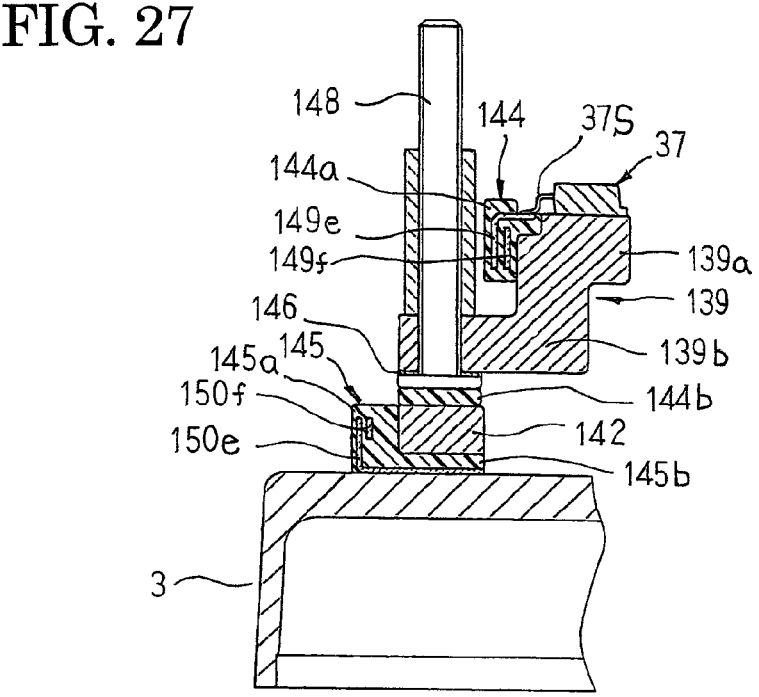
FIG. 27 is a cross section that is taken along line C-C in FIG. 23 so as to be viewed in the direction of the arrows.

FIG. 20 is a longitudinal section that shows an overall configuration of an automotive electric motor-generator according to Embodiment 4 of the present invention, FIG. 21 is a circuit diagram for explaining operation of the automotive electric motor-generator according to Embodiment 4 of the present invention, and FIG. 22 is a rear-end end elevation, as seen from the rear side, of the automotive electric motor-generator according to Embodiment 4 of the present invention. FIG. 23 is a rear-end end elevation, as seen from the rear side, of the automotive electric motor-generator according to Embodiment 4 of the present invention in a state in which a cover has been removed, FIG. 24 is a plan that shows a control apparatus in the automotive electric motor-generator according to Embodiment 4 of the present invention, FIG. 25 is a cross section that is taken along line A-A in FIG. 23 so as to be viewed in the direction of the arrows, FIG. 26 is a cross section that is taken along line B-B in FIG. 23 so as to be viewed in the direction of the arrows, and FIG. 27 is a cross section that is taken along line C-C in FIG. 23 so as to be viewed in the direction of the arrows.

In FIGS. 20 through 22, a motor 160 that constitutes part of an automotive electric motor-generator 101 includes: a front housing 2 and a rear housing 3 that are made of aluminum that have a plurality of air discharge aperture ribs 2a and 3a; a shaft 5 that is rotatably supported in the front housing 2 and the rear housing 3 by means of a bearing 4; a rotor 6 that is fixed to the shaft 5; and a stator 9 that is disposed so as to surround the rotor 6. The rotor 6 includes: a field winding 7 that generates magnetic flux on passage of an excitation current; and a pole core 8 that is disposed so as to cover the field winding 7 and in which magnetic poles are formed by the magnetic flux. The stator 9 includes: a stator core 10 that is disposed so as to be held between the front housing 2 and the rear housing 3 from two axial ends so as to surround the rotor 6; and an armature winding 11 that is installed in the stator core 10. The armature winding 11 is configured by wye-connecting (star-connecting) a U-phase coil, a V-phase coil, and a W-phase coil.

Fans 12 are welded onto two axial end surfaces of the pole core 8, and a pulley 13 is fixed by a nut to an end portion of the shaft 5 that projects out through the front housing 2. A brush holder 14 is mounted to the rear housing 3 so as to be positioned radially outside an end portion of the shaft 5 that projects out through the rear housing 3. Brushes 15 are disposed inside the brush holder 14 so as to slide in contact with slip rings 16 that are mounted to the end portion of the shaft 5 that projects out through the rear housing 3. The excitation current is supplied to the field winding 7 from outside by means of the brushes 15 and the slip rings 16. In addition, a rotational position detecting sensor 17 for vector control during electric drive is disposed on an axial end of the shaft 5 that projects out through the rear housing 3.

In addition to the motor 160 that is described above, a control apparatus 130 that constitutes a power semiconductor apparatus is mounted to the rear housing 3 in the automotive electric motor-generator 101 so as to be positioned radially outside the end portion of the shaft 5 that projects out through the rear housing 3.

A cover 118 is mounted onto the rear housing 3 so as to cover a control circuit board 120 to which a control circuit 119 is mounted, the control apparatus 130, and the brush holder 14 so as to prevent external foreign matter from entering. In addition, a plurality of air intake apertures 118a are disposed through end surfaces and side wall surfaces of the cover 118. Air intake apertures 2b and 3b are also disposed through end surfaces of the front housing 2 and the rear housing 3 in a vicinity of the shaft 5, and air discharge apertures 2c and 3c are disposed through side surfaces of the front housing 2 and the rear housing 3.

As shown in FIG. 21, the control apparatus 130 includes: three upper arms 131, 133, and 135 that are each configured by connecting four power MOSFETs 37 in parallel; and three lower arms 132, 134, and 136 that are each configured by connecting four power MOSFETs 38 in parallel. The sources of the four power MOSFETs 37 that are connected in parallel in the upper arm 131 are connected to the drains of the four power MOSFETs 38 that are connected in parallel in the lower arm 132. The sources of the four power MOSFETs 37 that are connected in parallel in the upper arm 133 are connected to the drains of the four power MOSFETs 38 that are connected in parallel in the lower arm 134. In addition, the sources of the four power MOSFETs 37 that are connected in parallel in the upper arm 135 are connected to the drains of the four power MOSFETs 38 that are connected in parallel in the lower arm 136. The control apparatus 130 is configured by connecting in parallel three sets of power MOSFETs 37 and 38 that have been connected in series in this manner. Here, power MOSFETs 37 and 38 have been used for the semiconductor elements, but semiconductor elements such as Insulated Gate Bipolar Transistors (IGBTs), etc., may also be used.

An intermediate point of the power MOSFETs 37 and 38 that are connected in series in the upper arm 131 and the lower arm 132 are connected to an end portion of the U-phase coil of the armature winding 11 by means of alternating-current wiring 21. An intermediate point of the power MOSFETs 37 and 38 that are connected in series in the upper arm 133 and the lower arm 134 are connected to an end portion of the W-phase coil of the armature winding 11 by means of the alternating-current wiring 21. An intermediate point of the power MOSFETs 37 and 38 that are connected in series in the upper arm 135 and the lower arm 136 are connected to an end portion of the W-phase coil of the armature winding 11 by means of the alternating-current wiring 21. A capacitor 22 is also connected in parallel between the upper and lower arms so as to smooth voltage fluctuations that result from switching of the power MOSFETs 37 and 38. A positive terminal and a negative terminal of a battery 23 are electrically connected to a positive electrode side and a negative electrode side, respectively, of the control apparatus 130 by means of direct-current wiring 24. Moreover, the negative electrode of the automotive electric motor-generator 101 and the negative electrode of the battery 23 may also be connected indirectly through separate positions on a vehicle frame, etc.

In an automotive electric motor-generator 101 that is configured in this manner, the control circuit 119 controls switching operations in the control apparatus 130. The control circuit 119 also controls a field current control circuit 26 so as to adjust a field current that is supplied to the field winding 7 of the rotor 6. In addition, the control circuit 119 has an inverter function for electric motor operation of the automotive electric motor-generator 101 and a rectifying function for power generation.

Here, during starting of an engine, direct-current power is supplied from the battery 23 to the control apparatus 130 by means of the direct-current wiring 24. The control circuit 119 that is mounted to the control circuit board 120 performs on-off control of the power MOSFETs 37 and 38 of the control apparatus 130 so as to convert the direct-current power to three-phase alternating-current power. The three-phase alternating-current power is supplied to the armature winding 11 by means of the alternating-current wiring 21. Thus, a rotating magnetic field is imparted around the field winding 7 of the rotor 6 to which a field current is being supplied by the field current control circuit 26, driving the rotor 6 to rotate. Rotational torque from the rotor 6 is transmitted to the engine by means of the shaft 5, the pulley 13, and a belt (not shown) so as to ignite and start the engine.

Then, once the engine has been started, rotational torque from the engine is transmitted to the automotive electric motor-generator 101 by means of a crank pulley, the belt, and the pulley 13. Thus, the rotor 6 is rotated, inducing a three-phase alternating-current voltage in the armature winding 11. Then, the control circuit 119 performs on-off control of the power MOSFETs 37 and 38 of the control apparatus 130 such that the three-phase alternating-current power that has been induced in the armature winding 11 is converted into direct-current power, and is supplied to the battery 23, and an electric load 25, etc.

Next, configuration of the control apparatus 130 will be explained with reference to FIGS. 23 through 27.

A first radiating plate 139 is made of copper and has been electroplated, and is formed so as to have a shape that has: a flat base portion 139a that has an approximate fan shape (a C shape); and flange portions 139b that are disposed so as to extend radially outward from a rear surface of the base portion 139a at four positions that include two circumferential end portions of the base portion 139a and portions that divide the base portion 139a into three equal sections circumferentially. Twelve N-channel power MOSFETs 37 are mounted to the first radiating plate 139 so as to line up in a single row circumferentially such that source terminals 37S and gate terminals 37G face radially outward by connecting drains thereof to a front surface (a mounting surface) of the base portion 139a using a lead-free solder. In addition, a plurality of ventilating apertures 151a are disposed so as to pass through the base portion 139a. Here, the power MOSFETs 37 correspond to a first switching element.

A first circuit board 144 is prepared by insert molding six insert conductors 149a through 149f, and is formed so as to have a shape that has: a flat base portion 144a that has an approximate fan shape (a C shape) that is parallel to an outer circumference of the base portion 139a of the first radiating plate 139; and flange portions 144b that are disposed so as to extend radially outward from a rear surface of the base portion 144a at four positions that include two circumferential end portions of the base portion 144a and portions that divide the base portion 144a into three equal sections circumferentially. The base portion 144a of the first circuit board 144 is disposed so as to be parallel to the outer circumference of the base portion 139a of the first radiating plate 139, and the flange portions 144b are disposed in close contact with rear surfaces of the flange portions 139a of the first radiating plate 139.

First through third radiating plate segments 141 through 143 are formed so as to have approximately identical sizes, are each made of copper and have been electroplated, and are formed so as to have flat arc shapes that are larger than the base portion 144a of the first circuit board 144. A plurality of ventilating apertures 151b are disposed so as to pass through the first through third radiating plate segments 141 through 143. In addition, four N-channel power MOSFETs 38 are mounted to each of the first through third radiating plate segments 141 through 143 so as to line up in a single row circumferentially such that source terminals 38S and gate terminals 38G face radially outward by connecting drains thereof to respective surfaces (mounting surfaces) using a lead-free solder. The first through third radiating plate segments 141 through 143 are arrayed in a single row circumferentially so as to constitute a second radiating plate 140 that has an approximate fan shape (a C shape) that is larger than the base portion 144a of the first circuit board 144. Here, the power MOSFETs 38 correspond to a second switching element.

A second circuit board 145 is prepared by insert molding six insert conductors 150a through 150f, and is formed so as to have an approximate fan shape (a C shape) that has: a base portion 145a that is parallel to an outer circumference of the second radiating plate 140; and flange portions 145b that extend radially inward from a rear surface of the base portion 145a at four positions that include two circumferential end portions of the base portion 145a and portions that divide the base portion 145a into three equal sections circumferentially. Moreover, the insert conductors 150a, 150c, and 150e correspond to an electrode member that has negative potential.

The second circuit board 145 is disposed in an approximate fan shape so as to be centered around a central axis of the rear housing 3 such that the flange portions 145b are placed in close contact with an end surface of the rear housing 3. The first through third radiating plate segments 141 through 143 are also disposed so as to line up in an approximate fan shape so as to be centered around the central axis of the rear housing 3 in close proximity to an inner circumferential side of the base portion 145a such that the mounting surfaces face axially outward and two end portions of each are placed on the flange portions 145b. The mounting surfaces of the first through third radiating plate segments 141 through 143 are positioned in a common plane with a front surface of the base portion 145a. In addition, the first circuit board 144 is disposed such that the flange portions 144b face the flange portions 145b of the second circuit board 145 across the first through third radiating plate segments 141 through 143. The first radiating plate 139 is disposed such that the mounting surface of the base portion 139a faces axially outward, the flange portions 139b are placed on the flange portions 144b of the first circuit board 144, and the base portion 139a is in close proximity to an inner circumferential side of the base portion 144a of the first circuit board 144.

The flange portions 139b at three positions that are not at a second circumferential end portion of the first radiating plate 139, the flange portions 144b at three positions that are not at a second circumferential end portion of the first circuit board 144, first circumferential end portions of each of the first through third radiating plate segments 141 through 143, and the flange portions 145b at three positions that are not at a second circumferential end portion of the second circuit board 145 are stacked axially on each other and securely fastened integrally to the rear housing 3 by mounting bolts 147. In addition, an output terminal bolt 148 that constitutes an external output terminal is mounted so as to pass through the flange portion 139b at the second circumferential end portion of the first radiating plate 139 from a rear surface side and project axially outward through the cover 118. A terminal 146 is interposed between a head portion of the output terminal bolt 148 and the flange portion 139b. The flange portion 144b of the first circuit board 144 is interposed between the output terminal bolt 148 and the third radiating plate segment 143 such that the two are in an insulated state.

Thus, except at their respective first and second circumferential end portions, the first through third radiating plate segments 141 through 143 are separated from a wall surface of the rear housing 3 by a distance equivalent to a thickness of the flange portions 145b of the second circuit board 145 so as to form a cooling airflow ventilation channel. The first radiating plate 139 and the first through third radiating plate segments 141 through 143 are also separated in an axial direction of the shaft 5 by a distance equivalent to a total thickness that includes at least a thickness of the flange portions 144b of the first circuit board 144 and a thickness of the flange portions 139b of the first radiating plate 139 so as to form a cooling airflow ventilation channel. In addition, the base portion 139a of the first radiating plate 139 is offset radially so as not to overlap with the first through third radiating plate segments 141 through 143 in an axial direction of the shaft 5.

Two of the insert conductors 149a and 149c are insert-molded into the first circuit board 144 such that first ends are exposed at a first circumferential end portion front surface of the first circuit board 144, and second end portions are exposed on surfaces in regions that correspond to the source terminals 37S of the four power MOSFETs 37 that constitute the upper arms 131 and 135, respectively. Two of the insert conductors 149b and 149d are insert-molded into the first circuit board 144 such that first ends are exposed at the first circumferential end portion front surface of the first circuit board 144, and second end portions are exposed on surfaces in regions that correspond to the gate terminals 37G of the four power MOSFETs 37 that constitute the upper arms 131 and 135, respectively. Exposed surfaces of the second end portions of the insert conductors 149a through 149d are positioned in a common plane with the mounting surface of the first radiating plate 139. The source terminals 37S and the gate terminals 37G of the four power MOSFETs 37 that constitute the upper arms 131 and 135 are soldered to the exposed surfaces of the corresponding insert conductors 149a through 149d.

Two of the insert conductors 149e and 149f are insert-molded into the first circuit board 144 such that first ends are exposed at a second circumferential end portion front surface of the first circuit board 144, and second end portions are exposed on surfaces in regions that correspond to the source terminals 37S and the gate terminals 37G, respectively, of the four power MOSFETs 37 that constitute the upper arm 133. Exposed surfaces of the second end portions of the insert conductors 149e and 149f are positioned in a common plane with the mounting surface of the first radiating plate 139. The source terminals 37S and the gate terminals 37G of the power MOSFETs 37 that constitute the upper arm 133 are soldered to the exposed surfaces of the corresponding insert conductors 149e and 149f.

Respective insert conductors 149a, 149c, and 149e branch off and are exposed on the rear surfaces of the flange portions 144b at three positions that do not include the second circumferential end portion of the first circuit board 144. The exposed surfaces of these insert conductors 149a, 149c, and 149e are placed in close contact with and electrically connected to the first radiating plate segment 141, the third radiating plate segment 143, and the second radiating plate segment 142, respectively, by the fastening force of the mounting bolts 147.

Similarly, in the second circuit board 145, two of the insert conductors 150a and 150c are insert-molded into the second circuit board 145 such that first ends are exposed at a first circumferential end portion front surface of the second circuit board 145, and second end portions are exposed on surfaces in regions of the base portion 145a that correspond to the source terminals 38S of the four power MOSFETs 38 that constitute the lower arms 132 and 136, respectively. Two of the insert conductors 150b and 150d are insert-molded into the second circuit board 145 such that first ends are exposed at the first circumferential end portion front surface of the second circuit board 145, and second end portions are exposed on surfaces in regions of the base portion 145a that correspond to the gate terminals 38G of the four power MOSFETs 38 that constitute the lower arms 132 and 136, respectively. The source terminals 38S and the gate terminals 38G of the four power MOSFETs 38 that constitute the lower arms 132 and 136 are soldered to the exposed surfaces of the corresponding insert conductors 150a through 150d.

Two of the insert conductors 150e and 150f are insert-molded into the second circuit board 145 such that first ends are exposed at a second circumferential end portion front surface of the second circuit board 145, and second end portions are exposed on surfaces in regions of the base portion 145a that correspond to the source terminals 38S and the gate terminals 38G, respectively, of the four power MOSFETs 38 that constitute the lower arm 134. The source terminals 38S and the gate terminals 38G of the power MOSFETs 38 that constitute the lower arm 134 are soldered to the exposed surfaces of the corresponding insert conductors 150e and 150f.

Respective insert conductors 150a and 150c branch off and are exposed on the rear surfaces of the flange portions 145b at two positions at the first circumferential end portion of the second circuit board 145. In addition, an insert conductor 150e branches off and is exposed on the rear surfaces of the flange portions 145b at two positions at the second circumferential end portion of the second circuit board 145. The exposed surfaces of these insert conductors 150a, 150c, and 150e are placed in close contact with and electrically connected to the wall surface of the rear housing 3 by the fastening force of the mounting bolts 147.

The control apparatus 130 that is configured in this manner is fastened to the end surface of the rear housing 3 by the three mounting bolts 147 so as to be disposed in an approximate fan shape radially outside the shaft 5. The control circuit board 120, to which the control circuit 119 that includes elements such as custom ICs, drivers, etc., that control operation of the power MOSFETs 37 and 38 is mounted, and the brush holder 14, into which the field current control circuit 26 and the capacitor 22, etc., that control the field current to the field winding 7 are integrated, are disposed in an approximately fan-shaped notch portion of the control apparatus 130.

The drains of the respective power MOSFETs 37 that constitute the upper arms 131, 133, and 135 are electrically connected to the output terminal bolt 148 by means of the first radiating plate 139 and are also led into the brush holder 14 by means of the terminal 146. The source terminals 38S of the respective power MOSFETs 38 that constitute the lower arms 132, 134, and 136 are electrically connected to the rear housing 3 by means of the insert conductors 150a, 150c, and 150e.

The source terminals 37S of the respective power MOSFETs 37 that constitute the upper arms 131, 133, and 135 are electrically connected to the first through third radiating plate segments 141 through 143, respectively, by means of the exposed surfaces of the insert conductors 149a, 149c, and 149e that are exposed on the rear surfaces of the flange portions 144b of the first circuit board 144. Output wires (the alternating-current wiring 21) of the U-phase coil, the V-phase coil, and the W-phase coil of the armature winding 11 are soldered to the first through third radiating plate segments 141 through 143, respectively.

The source terminals 37S and 38S and the gate terminals 37G and 38G of the power MOSFETs 37 and 38 are electrically connected to the control circuit 119 by means of the portions of the insert conductors 149a through 149f and 150a through 150f that are exposed at the circumferential end portions of the first and second circuit boards 144 and 145.

Now, when the fan 12 at the rear end is driven to rotate together with the rotation of the rotor 6, cooling airflows are sucked through the air intake apertures 118a into the cover 118. The cooling airflows that have been sucked into the cover 118 then flow in through the air intake apertures 3b into the rear housing 3, are deflected centrifugally by the fan 12, and are discharged through the air discharge apertures 3c.

Here, the cooling airflows flow as indicated by arrows Fa through Fd in FIG. 20. Specifically, as indicated by the arrow Fa, a cooling airflow that has flowed in through the air intake apertures 118a that are disposed through the end surface of the cover 118 flows radially inward over the front surface of the base portion 139a of the first radiating plate 139, and flows toward the rear housing 3 by passing between the first radiating plate 139 and the shaft 5. As indicated by the arrow Fb, a portion of the cooling airflow that has flowed in through the air intake apertures 118a that are disposed through the end surface of the cover 118 flows toward the rear housing 3 by flowing between the first radiating plate 139 and the second radiating plate 140.

In addition, as indicated by the arrow Fc, a cooling airflow that has flowed in through the air intake apertures 118a that are disposed through the side surface of the cover 118 flows toward the rear housing 3 by flowing between the first radiating plate 139 and the second radiating plate 140. As indicated by the arrow Fd, a portion of the cooling airflow that has flowed in through the air intake apertures 118a that are disposed through the side surface of the cover 118 flows radially inward by flowing between the second radiating plate 140 and the wall surface of the rear housing 3. The cooling airflows that have flowed through the respective ventilation channels flow into the rear housing 3 through the air intake apertures 3b, are deflected centrifugally by the fan 12, and are discharged through the air discharge apertures 3c. The power MOSFETs 37 and 38, the first and second radiating plates 139 and 140, and the control circuit board 120, as well as the rear-end coil ends of the armature winding 11 and the air discharge aperture ribs 3*a*, are thereby cooled.

When the fan 12 at the front end is driven to rotate, cooling airflows are sucked in through the air intake apertures 2*b* into the front housing 2. The cooling airflows that have been sucked into the front housing 2 are deflected centrifugally by the fan 12, and are discharged through the air discharge apertures 2*c*. Front-end coil ends of the armature winding 11 and the air discharge aperture ribs 2*a* are thereby cooled.

According to Embodiment 4, because the first radiating plate 139 and the second radiating plate 140 are disposed in two layers in an axial direction of the shaft 5, the first and second radiating plates 139 and 140 can be enlarged within the limited radial dimensions. Thus, because the surface areas and volumes of the first and second radiating plates 139 and 140 for cooling the power MOSFETs 37 and 38 that generate a large quantity of heat in the control apparatus 130 can be enlarged, the power MOSFETs 37 and 38 can be cooled effectively without enlarging the control apparatus 130. Thus, desired surface areas and volumes of the first and second radiating plates 139 and 140 can be ensured within the limited radial dimensions, enabling reductions in the size of the control apparatus 130.

Cooling airflow ventilation channels are formed between a front surface side of the first radiating plate 139 and the first radiating plate 139 and the second radiating plate 140, and also between the second radiating plate 140 and the wall surface of the rear housing 3. Thus, cooling can be improved because the cooling airflows flow over two surfaces of the first radiating plate 139 and the second radiating plate 140. Because accumulation of foreign matter and electrically conductive deposits, etc., is avoided, the occurrence of leakage currents between the different electric potentials, and galvanic corrosion, etc., can also be prevented. In addition, because ventilation resistance is reduced, airflow rate can be increased and wind noise can also be reduced.

Because the first radiating plate 139 and the second radiating plate 140 are offset in the radial direction of the shaft 5, cooling airflows that flow axially are directed to the second radiating plate 140 without being obstructed by the first radiating plate 139. Thus, because the cooling airflows reach the second radiating plate 140 without being warmed by cooling the first radiating plate 139, cooling airflows that have not been warmed are directed to the first radiating plate 139 and the second radiating plate 140, improving cooling.

Because the ventilating apertures 151*a* and 151*b* are formed so as to pass through the first and second radiating plates 139 and 140, cooling airflows that flow axially and radially flow through the ventilating apertures 151*a* and 151*b*. Thus, because ventilation resistance is reduced, airflow rate can be increased, and wind noise can be reduced.

Because the output terminal bolt 148 projects axially outward from a rear-end end portion of the automotive electric motor-generator 101, connecting wiring with the external components such as the battery 23, etc., is facilitated if space is present rearward in a vehicle.

Because the output terminal bolt 148 is mounted to the first radiating plate 139, a flange portion 139*b* for mounting the output terminal bolt 148 is required on the first radiating plate 139, reducing the heat radiating area of the first radiating plate 139. However, because the first radiating plate 139 onto which the output terminal bolt 148 is mounted is positioned upstream from the second radiating plate 140 in the axial direction of flow of the cooling airflows, deterioration in cooling due to the reduction in heat radiating area is suppressed.

Here, it is desirable to make the radial width of the base portion 139*a* of the first radiating plate 139 greater than the radial width of the base portion of the second radiating plate 140. In that case, because the heat radiating area of the first radiating plate 139 is increased, cooling of the first radiating plate 139 is prevented from deteriorating due to the output terminal bolt 148 being mounted. Thus, the cooling efficiency of the first radiating plate 139 becomes approximately equal to the cooling efficiency of the second radiating plate 140, enabling the power MOSFETs 37 and 38 that are mounted to the first and second radiating plates 139 and 140 to be cooled to approximately identical temperatures. In addition, because rigidity of the first radiating plate 139 is increased, mechanical strength against external forces from external connecting wires is improved. Thus, even if external forces when external components such as the battery 23, etc., are connected to the output terminal bolt 148, or stresses that result from vibrating external forces, etc., act on the first radiating plate 139, situations in which the first radiating plate 139 might break are prevented.

Because the first and second radiating plates 139 and 140 and the first and second circuit boards 144 and 145 are fastened integrally onto the end surface of the rear housing 3 by the mounting bolts 147 in an assembled state, highly-reliable vibration resistance is achieved.

The second radiating plate 140 is fixed to the end surface of the rear housing 3 by means of the flange portions 145*b* of the second circuit board 145 (an insulating member). Thus, because heat from the power MOSFETs 38 is conducted to the rear housing 3 by means of the second radiating plate 140 and the flange portions 145*b*, the power MOSFETs 38 can be cooled effectively.

The front surface of the base portion 145*a* is positioned in a common plane with the mounting surfaces of the first through third radiating plate segments 141 through 143, the second end portions of the insert conductors 150*a* through 150*f* are exposed on the front surface of the base portion 145*a* at regions that correspond to the source terminals 38S and the gate terminals 38G of the power MOSFETs 38, and the source terminals 38S and the gate terminals 38G of the power MOSFETs 38 are soldered to the exposed surfaces of the corresponding insert conductors 150*a* through 150*f*. Thus, the source terminals 38S and the gate terminals 38G of the power MOSFETs 38 and the insert conductors 150*a* through 150*f* can be connected directly and simply, making reductions in size possible.

The insert conductors 150*a*, 150*c*, and 150*e* that are electrically connected to the source terminals 38S of the power MOSFETs 38 are insert-molded into the second circuit board 145 so as to be exposed on the rear surfaces of the flange portions 145*b*, and are placed in contact with the end surface of the rear housing 3 by the fastening force of the mounting bolts 147. Thus, connecting electrode members that connect the insert conductors 150*a*, 150*c*, and 150*e* and the rear housing 3 are no longer necessary, reducing the number of parts proportionately, and enabling weight, and cost, etc., to be reduced, and also simplifying connecting processes. In addition, because the rear housing 3 is used as ground for the automotive electric motor-generator 101, electrode members that have negative potential are no longer necessary, reducing the number of parts, and enabling weight, and cost, etc., to be reduced. Because the source terminals 38S of the power MOSFETs 38 are connected to the rear housing 3 by means of the insert conductors 150*a*, 150*c*, and 150*e*, heat from the power MOSFETs 38 is transferred to the low-temperature rear housing 3 directly without air intervening, enabling temperature increases in the power MOSFETs 38 to be suppressed.

Embodiment 5

Figure 28:
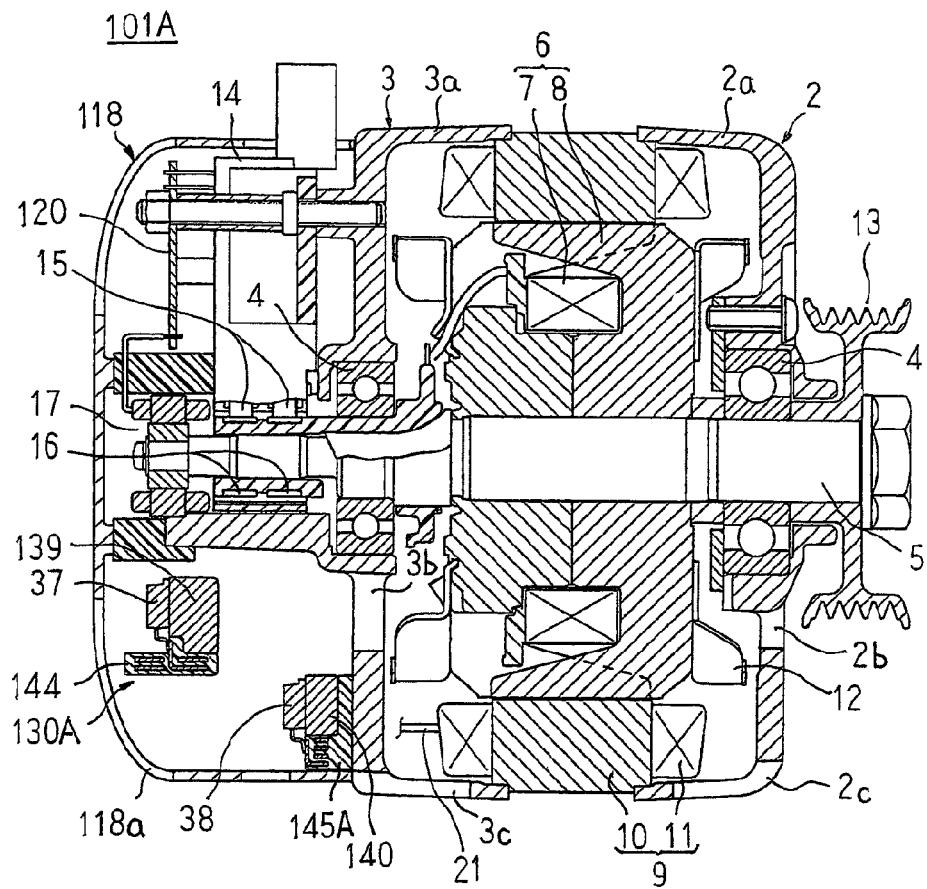
FIG. 28 is a longitudinal section that shows an overall configuration of an automotive electric motor-generator according to Embodiment 5 of the present invention.
Figure 29:
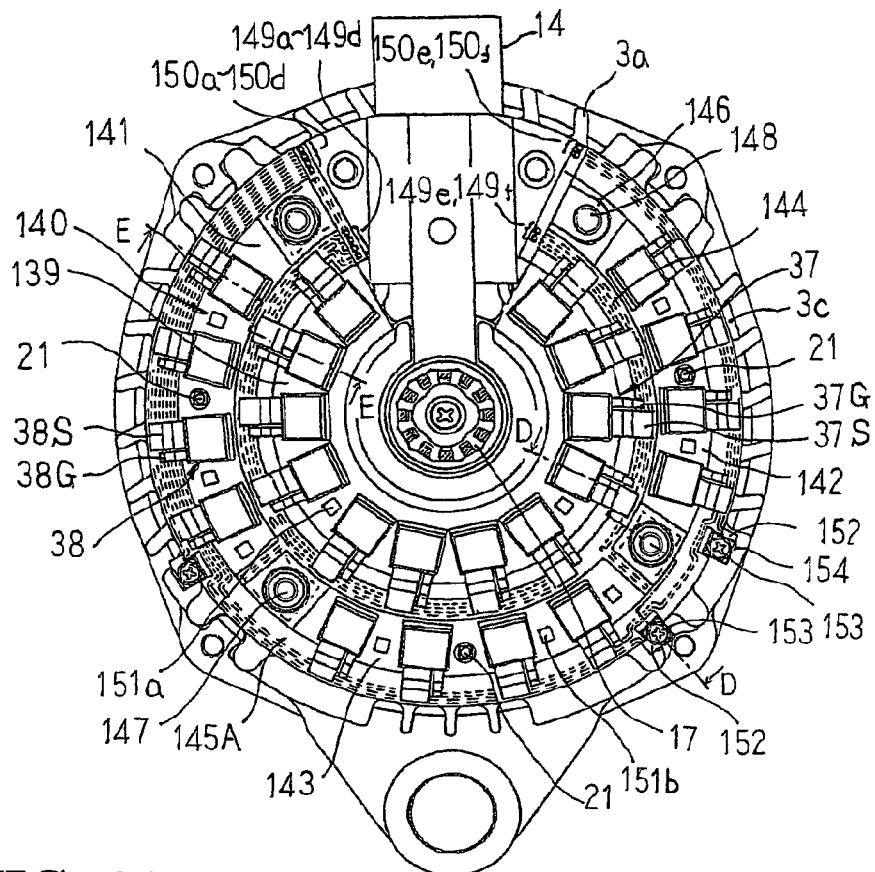
FIG. 29 is a rear-end end elevation, as seen from the rear side, of the automotive electric motor-generator according to Embodiment 5 of the present invention in a state in which a cover has been removed.
Figure 30:
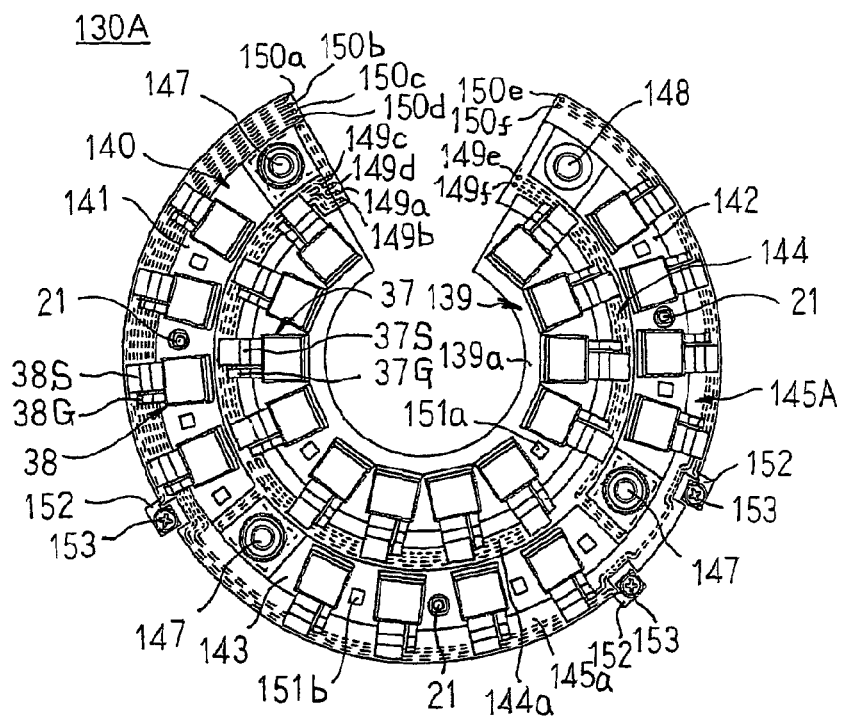
FIG. 30 is a plan that shows a control apparatus in the automotive electric motor-generator according to Embodiment 5 of the present invention.
Figure 31:
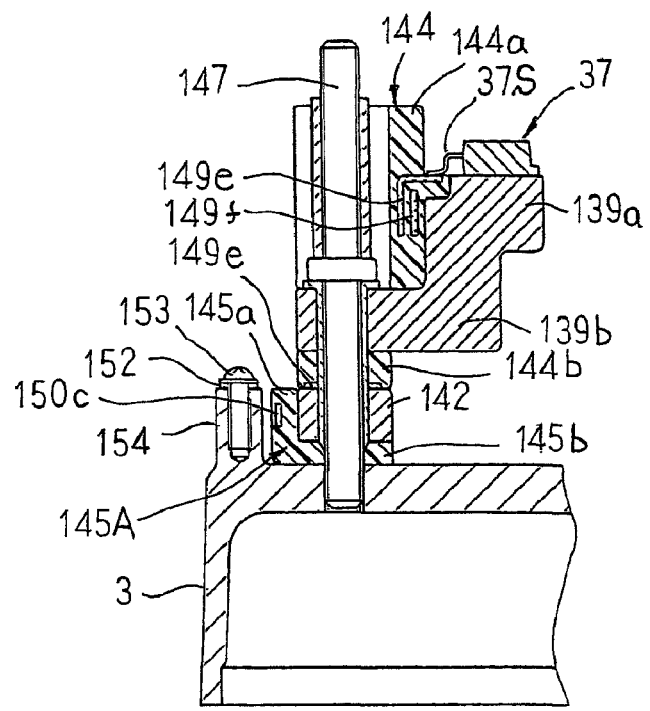
FIG. 31 is a cross section that is taken along line D-D in FIG. 29 so as to be viewed in the direction of the arrows.
Figure 32:
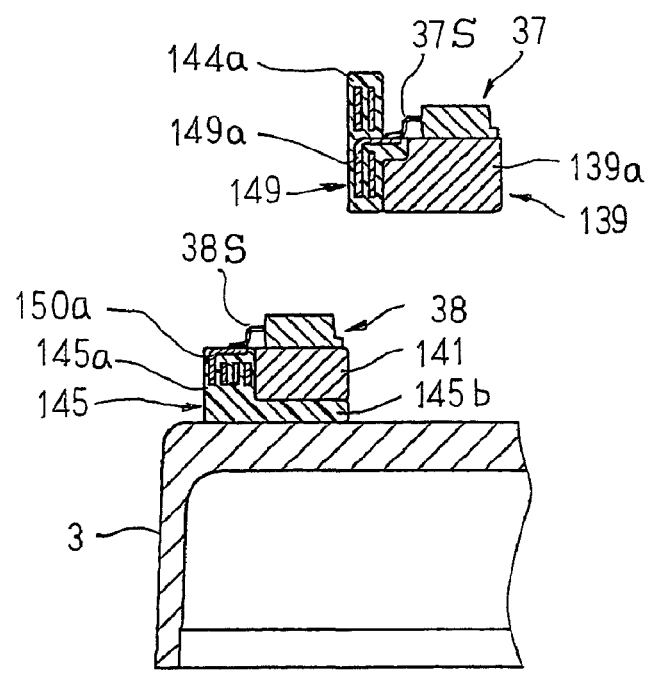
FIG. 32 is a cross section that is taken along line E-E in FIG. 29 so as to be viewed in the direction of the arrows.

FIG. 28 is a longitudinal section that shows an overall configuration of an automotive electric motor-generator according to Embodiment 5 of the present invention, FIG. 29 is a rear-end end elevation, as seen from the rear side, of the automotive electric motor-generator according to Embodiment 5 of the present invention in a state in which a cover has been removed, FIG. 30 is a plan that shows a control apparatus in the automotive electric motor-generator according to Embodiment 5 of the present invention, FIG. 31 is a cross section that is taken along line D-D in FIG. 29 so as to be viewed in the direction of the arrows, and FIG. 32 is a cross section that is taken along line E-E in FIG. 29 so as to be viewed in the direction of the arrows.

In FIGS. 28 through 32, a second circuit board 145A in a control apparatus 130A is formed so as to have an approximate fan shape that has an L-shaped cross section that is constituted by a base portion 145*a* and a flange portion 145*b*. First through third radiating plate segments 141 through 143 that constitute a second radiating plate 140 are arrayed in an approximate fan shape, and are molded integrally with a second circuit board 145A such that front surfaces and inner wall surfaces of each are exposed. The front surfaces of the first through third radiating plate segments 141 through 143 that have been arrayed in an approximate fan shape are positioned level with a front surface of the base portion 145*a* of the second circuit board 145A, and the rear surfaces of the first through third radiating plate segments 141 through 143 are covered by the flange portion 145*b*.

Six insert conductors 150*a* through 150*f* are also insert-molded into the second circuit board 145A, but instead of being exposed on a rear surface of the flange portion 145*b*, portions of the insert conductors 150*a*, 150*c*, and 150*e* extend radially outward from the base portion 145*a* in a vicinity of connecting protrusion portions 154 that are disposed so as to protrude from an end surface of a rear housing 3. Projecting portions 152 of the insert conductors 150*a*, 150*c*, and 150*e* are respectively fastened to the connecting protrusion portions 154 of the rear housing 3 by screws 153.

Moreover, the rest of this embodiment is configured in a similar manner to Embodiment 4 above.

In this automotive electric motor-generator 101A, the second circuit board 145A and the first through third radiating plate segments 141 through 143 are disposed on the rear housing 3 in an approximate fan shape so as to be centered around the central axis of the rear housing 3. The first circuit board 144 is disposed such that the flange portions 144*b* face the flange portion 145*b* of the second circuit board 145A across the first through third radiating plate segments 141 through 143. In addition, the first radiating plate 139 is disposed such that the flange portions 139*b* are placed on the flange portions 144*b* of the first circuit board 144 and the base portion 139*a* is in close proximity to an inner circumferential side of the base portion 144*a* of the first circuit board 144.

The flange portions 139*b* at three positions that are not at a second circumferential end of the first radiating plate 139, the flange portions 144*b* at three positions that are not at a second circumferential end portion of the first circuit board 144, first circumferential ends of each of the first through third radiating plate segments 141 through 143, and the flange portion 145*b* of the second circuit board 145A are stacked axially on each other and securely fastened to the rear housing 3 by mounting bolts 147. In addition, the output terminal bolt 148 is mounted so as to pass through the flange portion 139*b* at the second circumferential end of the first radiating plate 139 from a rear surface side and project axially outward through the cover 118. The projecting portions 152 of the insert conductors 150*a*, 150*c*, and 150*e* are fastened to the connecting protrusion portions 154 of the rear housing 3 by the screws 153. A terminal 146 is interposed between a head portion of the output terminal bolt 148 and the flange portion 139*b*. In addition, although not shown, the flange portion 144*b* of the first circuit board 144 is interposed between the output terminal bolt 148 and the third radiating plate segment 143 such that the two are in an insulated state.

In an automotive electric motor-generator 101A that is configured in this manner, the flange portion 145*b* is placed in close contact with the end surface of the rear housing 3 around an entire circumferential region of the second circuit board 145A, and the control apparatus 130A is cooled by heat transfer through the flange portion 145*b* of the second circuit board 145A to the rear housing 3, in addition to the cooling airflows Fa through Fc that are shown in FIG. 20.

In Embodiment 5, because the first and second radiating plates 139 and 140 are disposed in two layers in an axial direction so as to be offset from each other radially in a similar manner to Embodiment 4 above, ventilation resistance is also reduced, increasing the cooling airflow rate. Heat from the power MOSFETs 38 is transferred from the second radiating plate 140 to the rear housing 3 by means of the flange portion 145*b* of the second circuit board 145A, and is cooled by the cooling airflows by means of the air discharge aperture ribs 3*a*. Thus, because the flow rate of the cooling airflows is increased and the rate of heat transfer to the rear housing 3 is also increased, the rate of heat exchange from the rear housing 3 is increased by synergistic reinforcement of the two, suppressing temperature increases in the control apparatus 130A.

Because the second radiating plate 140 (the first through third radiating plate segments 141 through 143) and the second circuit board 145A are integrated by insert molding, highly-reliable vibration resistance can be achieved, and the number of parts is also reduced, simplifying assembly.

The flange portion 145*b* of the circuit board 145A is formed so as to have an approximate fan shape. Thus, heat from the power MOSFETs 38 is transferred to the low-temperature rear housing 3 directly through the second radiating plate 140 and the flange portion 145*b*, suppressing temperature increases in the power MOSFETs 38. The first radiating plate 139, the second radiating plate 140, and the first and second circuit boards 144 and 145A are also securely fastened such that a wide area of the approximately fan-shaped flange portion 145*b* is placed in contact with the end surface of the rear housing 3, achieving even more highly-reliable vibration resistance.

Moreover, in conventional techniques, the drains and sources (grounds) of the lower arms are not in a common plane, spatially requiring connecting members for connection and leading to increases in size. However, in Embodiment 5, the projecting portions 152 of the insert conductors 150*a*, 150*c*, and 150*e* extend outward from the base portion 145*a* in the vicinity of the connecting protrusion portions 154 of the rear housing 3 at an approximately uniform height. Thus, the lengths of the projecting portions 152 of the insert conductors 150*a*, 150*c*, and 150*e* are shortened, facilitating connection between the projecting portions 152 and the connecting protrusion portions 154. In other words, according to Embodiment 5, large connecting members that were required in conventional techniques are no longer necessary, enabling reductions in size.

Embodiment 6

Figure 33:
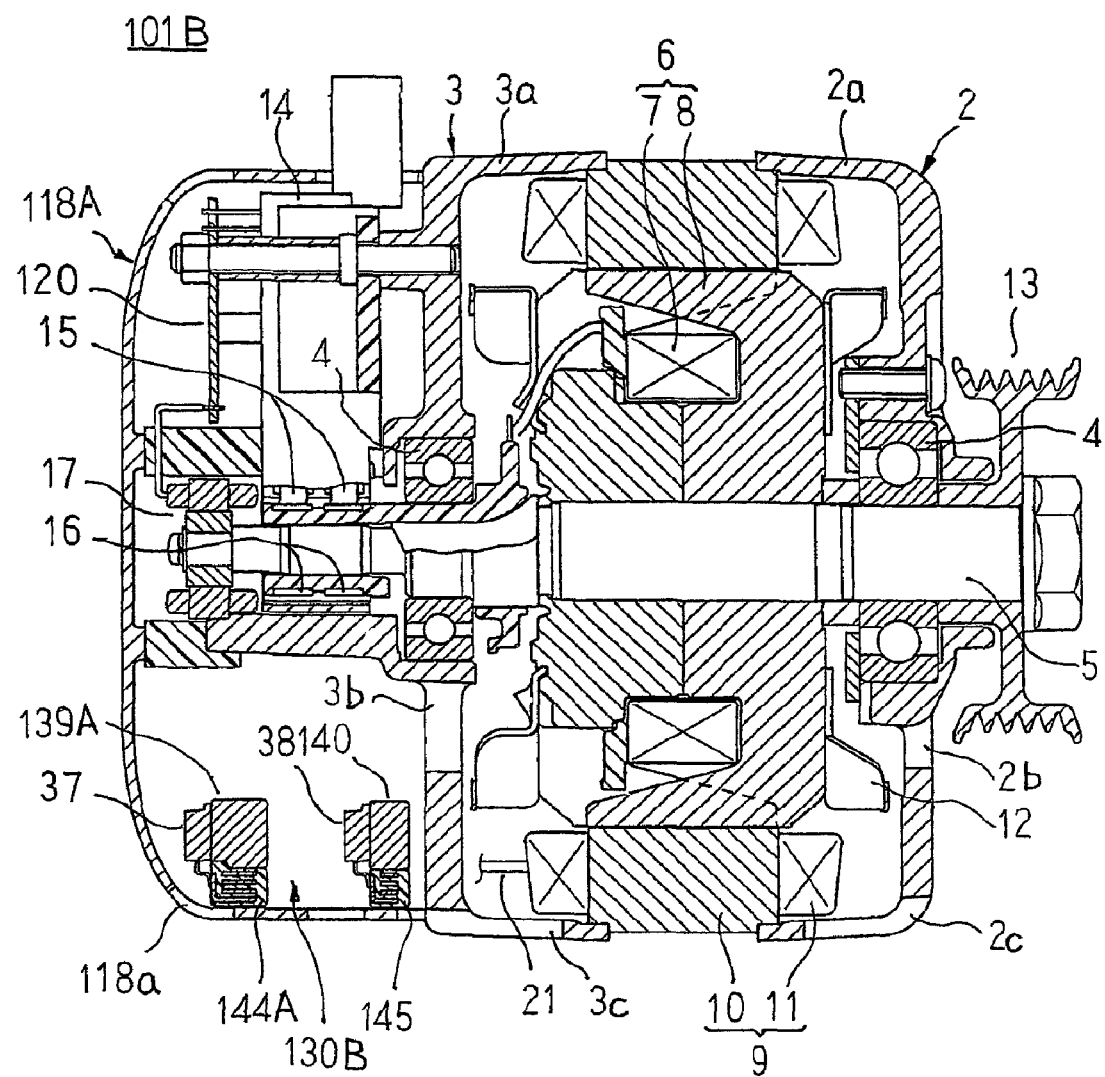
FIG. 33 is a longitudinal section that shows an overall configuration of an automotive electric motor-generator according to Embodiment 6 of the present invention.
Figure 34:
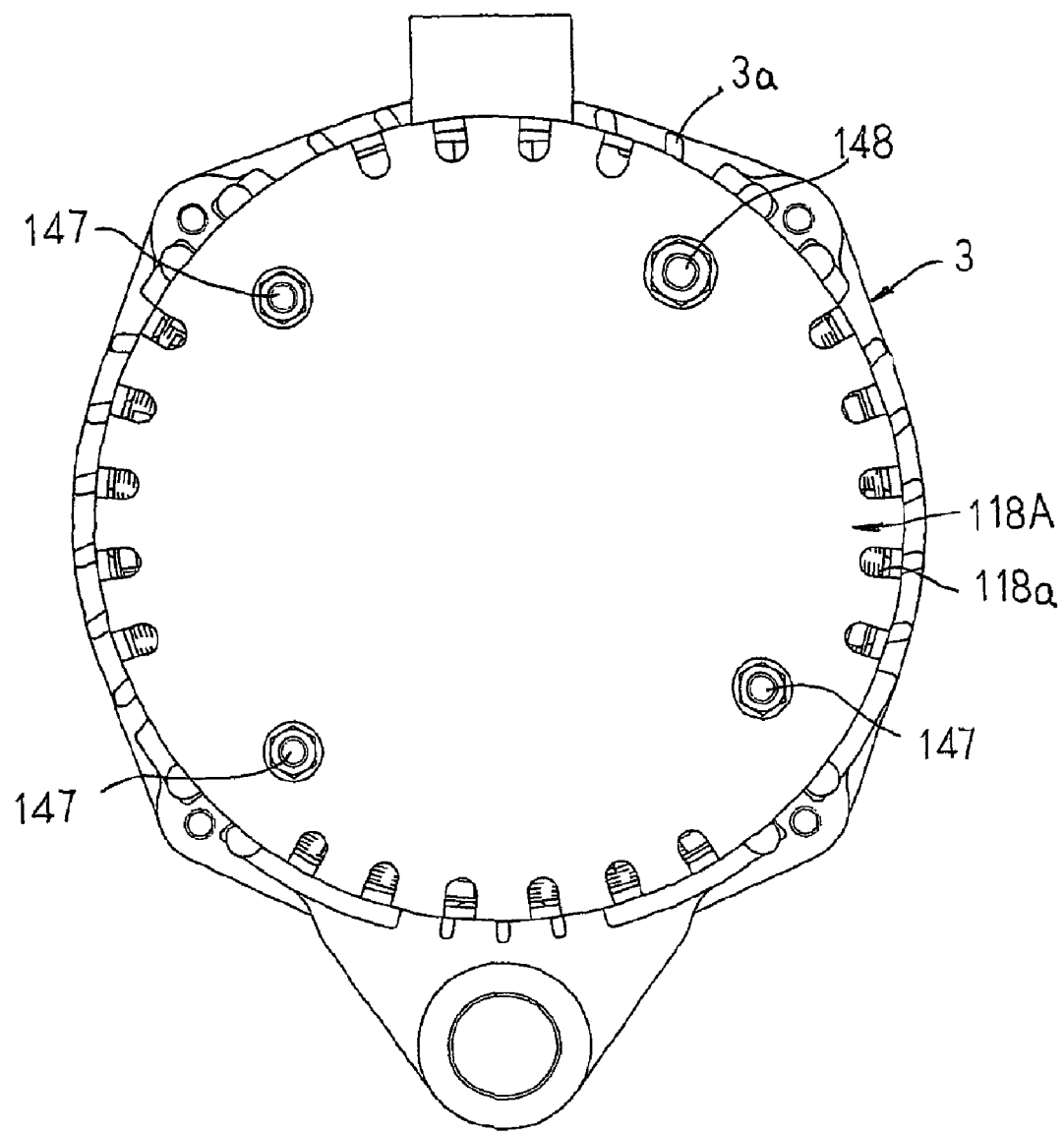
FIG. 34 is a rear-end end elevation, as seen from the rear side, of the automotive electric motor-generator according to Embodiment 6 of the present invention.
Figure 35:
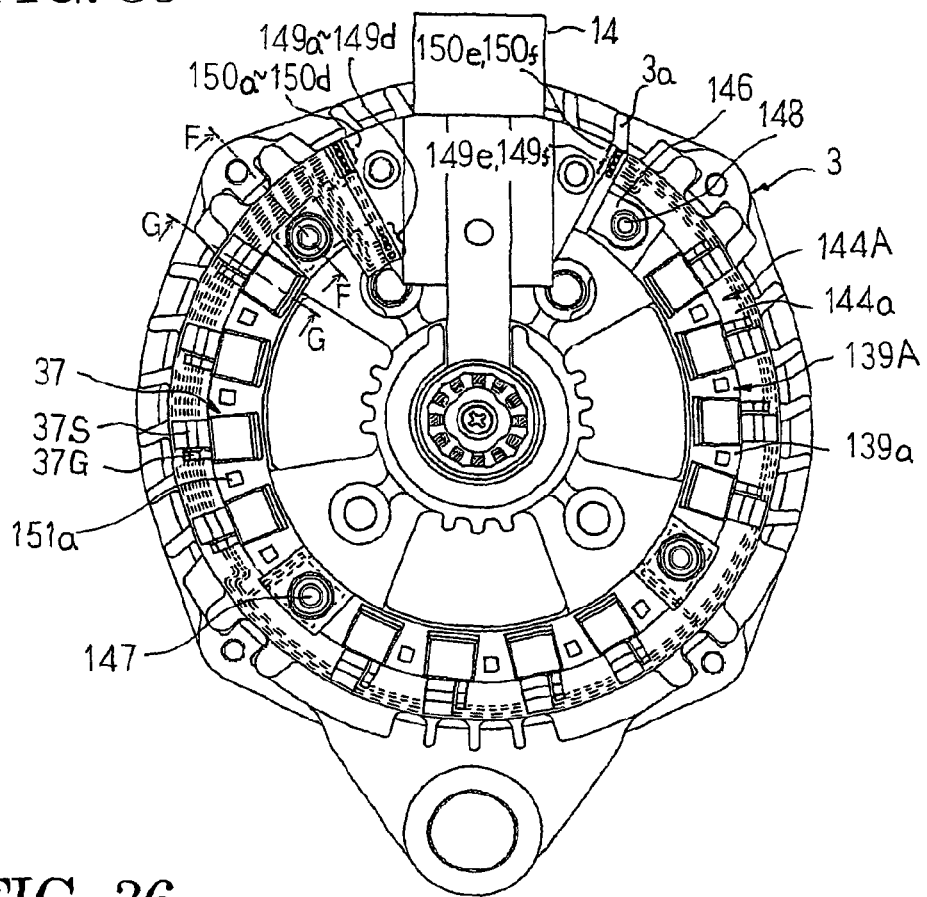
FIG. 35 is a rear-end end elevation, as seen from the rear side, of the automotive electric motor-generator according to Embodiment 6 of the present invention in a state in which a cover has been removed.
Figure 36:
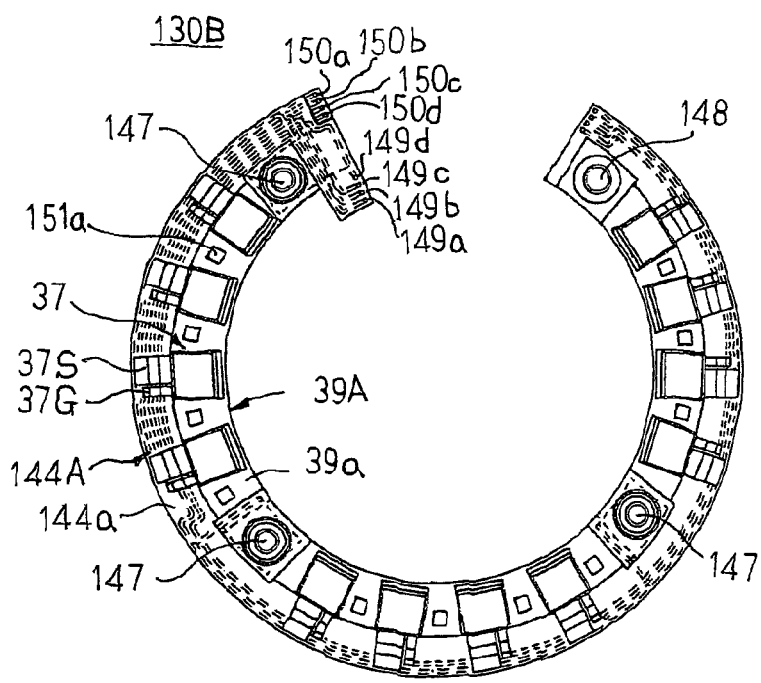
FIG. 36 is a plan that shows a control apparatus in the automotive electric motor-generator according to Embodiment 6 of the present invention.
Figure 37:
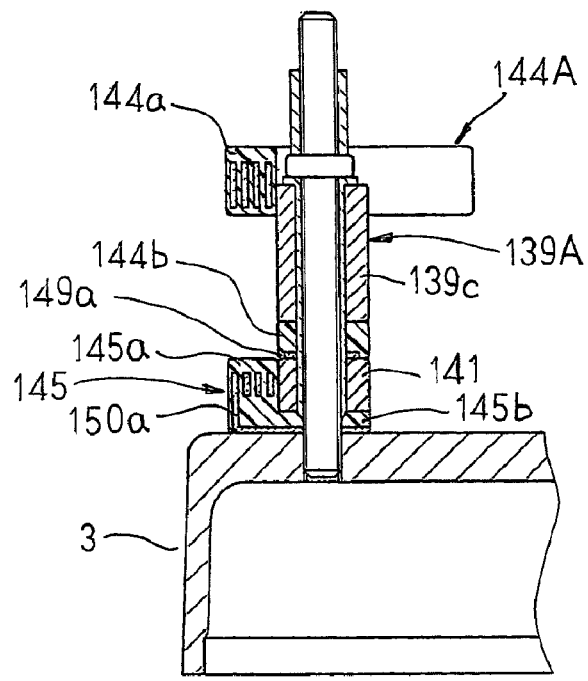
FIG. 37 is a cross section that is taken along line F-F in FIG. 35 so as to be viewed in the direction of the arrows.
Figure 38:
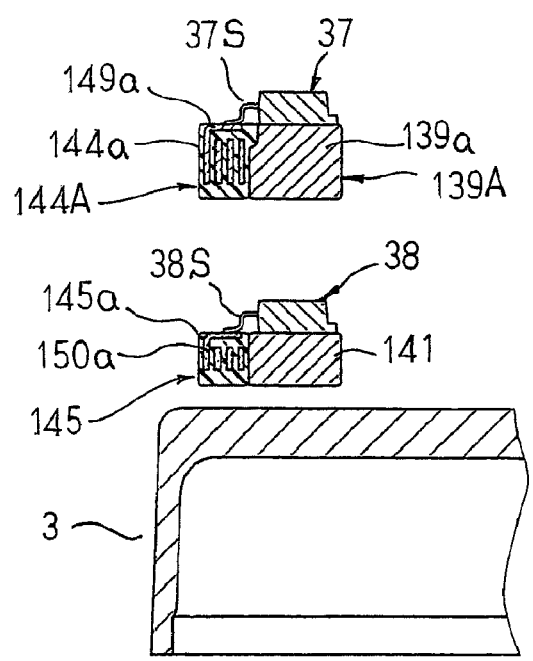
FIG. 38 is a cross section that is taken along line G-G in FIG. 35 so as to be viewed in the direction of the arrows.

FIG. 33 is a longitudinal section that shows an overall configuration of an automotive electric motor-generator according to Embodiment 6 of the present invention, FIG. 34 is a rear-end end elevation, as seen from the rear side, of the automotive electric motor-generator according to Embodiment 6 of the present invention, FIG. 35 is a rear-end end elevation, as seen from the rear side, of the automotive electric motor-generator according to Embodiment 6 of the present invention in a state in which a cover has been removed, FIG. 36 is a plan that shows a control apparatus in the automotive electric motor-generator according to Embodiment 6 of the present invention, FIG. 37 is a cross section that is taken along line F-F in FIG. 35 so as to be viewed in the direction of the arrows, and FIG. 38 is a cross section that is taken along line G-G in FIG. 35 so as to be viewed in the direction of the arrows.

In FIGS. 33 through 38, a first radiating plate 139A in a control apparatus 130B is formed so as to have a shape that has: a flat base portion 139a that has an approximate fan shape that is similar to that of a second radiating plate 140 that is formed by arraying first through third radiating plate segments 141 through 143 into an approximate fan shape; and flange portions 139c that are disposed so as to project from rear surface portions of the base portion 139a at four positions that include two circumferential end portions of the base portion 139a and portions that divide the base portion 139a into three equal sections circumferentially. In other words, thicknesses of portions of the base portion 139a at the flange portions 139c are increased at rear surface portions. A first circuit board 144A is formed so as to have a shape that has: a flat base portion 144a that has an approximate fan shape (a C shape) that is parallel to an outer circumference of the base portion 139a of the first radiating plate 139A; and flange portions 144b that are disposed so as to extend radially outward from a rear surface of the base portion 144a at four positions that include two circumferential end portions of the base portion 144a and portions that divide the base portion 144a into three equal sections circumferentially.

Six insert conductors 149a through 149f are insert-molded into this first circuit board 144A, and portions of the insert conductors 149a, 149c, and 149e are exposed on the rear surfaces of the flange portions 144b at three positions that do not include the second circumferential end portion of the first circuit board 144A. The exposed surfaces of these insert conductors 149a, 149c, and 149e are placed in close contact with and electrically connected to the first radiating plate segment 141, the third radiating plate segment 143, and the second radiating plate segment 142, respectively, by the fastening force of mounting bolts 147.

Air intake apertures 118a are formed only in side wall surfaces of a cover 118A, not in an end surface. The air intake apertures 118a are formed in the cover 118A so as to be positioned radially outside respective positions that are on an opposite side of the first radiating plate 139A from a rear housing, between the first radiating plate 139A and the second radiating plate 140, and also near the rear housing from the second radiating plate 140.

Moreover, the rest of this embodiment is configured in a similar manner to Embodiment 4 above.

In this automotive electric motor-generator 101B, the second circuit board 145 is disposed on the rear housing 3 in an approximate fan shape so as to be centered around the central axis of the rear housing 3, and the first through third radiating plate segments 141 through 143 are disposed so as to line up in an approximate fan shape so as to be centered around the central axis of the rear housing 3 in close proximity to an inner circumferential side of the base portion 145a such that two end portions of each are placed on the flange portions 145b. The first circuit board 144A is disposed such that the flange portions 144b face the flange portion 145b of the second circuit board 145 across the first through third radiating plate segments 141 through 143. In addition, the first radiating plate 139A is disposed such that the respective flange portions 139c are placed on the flange portions 144b of the first circuit board 144A and the base portion 139a is in close proximity to an inner circumferential side of the base portion 144a of the first circuit board 144A.

The flange portions 139c that are not at a second circumferential end portion of the first radiating plate 139A, the flange portions 144b at three positions that are not at a second circumferential end portion of the first circuit board 144A, first circumferential end portions of each of the first through third radiating plate segments 141 through 143, and the flange portions 145b at three positions that are not at a second circumferential end portion of the second circuit board 145 are each securely fastened to the rear housing 3 by the mounting bolts 147. In addition, an output terminal bolt 148 is mounted so as to pass through the flange portion 139b at the second circumferential end portion of the first radiating plate 139A from a rear surface side. A terminal 146 is interposed between a head portion of the output terminal bolt 148 and the flange portion 139b. The flange portion 144b of the first circuit board 144A is interposed between the output terminal bolt 148 and the third radiating plate segment 143 such that the two are in an insulated state.

Thus, except at their respective first and second circumferential end portions, the first through third radiating plate segments 141 through 143 are separated from a wall surface of the rear housing 3 by a distance equivalent to a thickness of the flange portions 145b of the second circuit board 145 so as to form a cooling airflow ventilation channel. The first radiating plate 139A and the first through third radiating plate segments 141 through 143 are also separated in an axial direction of the shaft 5 by a distance equivalent to a total thickness that includes at least a thickness of the flange portions 144b of the first circuit board 144A and a thickness of the flange portions 139c of the first radiating plate 139A so as to form a cooling airflow ventilation channel. In addition, the base portion 139a of the first radiating plate 139A overlaps with the second radiating plate 140 that is constituted by the first through third radiating plate segments 141 through 143 relative to an axial direction of the shaft 5.

In Embodiment 6, because the first and second radiating plates 139A and 140 are also disposed in two layers in an axial direction, similar effects to those in Embodiment 4 above can be achieved.

Because the first and second radiating plates 139A and 140 are disposed so as to have similar radial positions, i.e., so as to overlap with each other axially, and the air intake apertures 118a are formed only in side wall surfaces of the cover 118A, cooling airflows that have flowed inside the cover 118A through the air intake apertures 118a, flow radially inward on an opposite side of the first radiating plate 139A from a rear housing, between the first radiating plate 139A and the second radiating plate 140, and also near the rear housing from the second radiating plate 140, respectively, and flow into the rear housing 3 through the air intake apertures 3b. Thus, the heat radiating area of the first and second radiating plates 139A and 140 can be increased without inhibiting radial flow of the cooling airflows. Because cooling airflows that have a temperature identical to that of the ambient temperature flow radially inward to the first and second radiating plates 139A and 140, highly-reliable cooling can be achieved. In addition, because the temperatures of the cooling airflows that are supplied to the first and second radiating plates 139A and 140 are approximately equal, the power MOSFETs 37 and 38 that are mounted to the first and second radiating plates 139A and 140 can be cooled to approximately identical temperatures.

Because the first and second radiating plates 139A and 140 overlap with each other axially, ventilation channels in which cooling airflows flow over the first and second radiating plates 139A and 140, flow to a vicinity of the shaft 5, then flow through to the air intake apertures 3b are ensured in the vicinity of the shaft 5. Thus, because ventilation resistance is reduced, airflow rate is increased, improving cooling.

If high-temperature portions such as engine air discharge pipes, etc., are disposed behind an automotive electric motor-generator, or large output terminal mounts are mounted behind an automotive electric motor-generator, etc., flow of the cooling airflows into the automotive electric motor-generator may be obstructed, making cooling poor. However, if this automotive electric motor-generator 101B is applied to cases in which a high-temperature portion such as an engine air discharge pipe, etc., is disposed behind the automotive electric motor-generator 101B, or cases in which a large output terminal mount is mounted behind the automotive electric motor-generator 101B, the engine air discharge pipe, or output terminal mount, etc., will not obstruct the radial flow of the cooling airflows, enabling superior cooling to be achieved.

Moreover, in Embodiments 4 through 6 above, the upper arms 131, 133, and 135 and the lower arms 132, 134, and 136 are explained as being each configured by connecting four power MOSFETs 37 or 38 in parallel, but the number of power MOSFETs 37 or 38 in parallel is not limited to four, and is appropriately set so as to correspond to the required output capacity of the automotive electric motor-generator, and the maximum capacity and permissible temperature of the semiconductor elements, etc., and the number of power MOSFETs 37 or 38 in parallel may also be two or three, for example, or single power MOSFETs 37 or 38 may also be used.

In Embodiments 4 through 6 above, the output terminal bolt 148 is mounted so as to project axially outward, but an output terminal bolt may also be mounted so as to project radially outward.

What is claimed is:

1. An automotive electric motor-generator comprising:
   a motor comprising:
      a rotor that is rotatably disposed inside a housing;
      a stator that is disposed so as to surround a radially-outer side of said rotor; and
      at least one fan that is fixed to an axial end surface of said rotor,
      said motor functioning as a generator and as an electric motor; and
   a power semiconductor apparatus that controls a current that is supplied to said motor,
   wherein:
   said power semiconductor apparatus comprises:
      a fan-shaped first radiating plate that is disposed in a fan shape that is centered around a shaft of said rotor in a plane that is perpendicular to said shaft outside a first axial end of said housing, to which a first switching element that is constituted by an N-channel semiconductor element is mounted, and that has a drain potential for said first switching element;
      a fan-shaped second radiating plate that is disposed in a fan shape that is centered around said shaft in a plane that is perpendicular to said shaft of said rotor between said first radiating plate and a first axial end surface of said housing, to which a second switching element that is constituted by an N-channel semiconductor element is mounted, and that has a drain potential for said second switching element;
      first ventilating apertures formed in the first radiating plate so as to pass axially therethrough; and
      second ventilating apertures formed in the second radiating plate so as to pass axially therethrough.

2. An automotive electric motor-generator according to claim 1, wherein said first and second radiating plates are disposed so as to be in mutually-different radial positions.

3. An automotive electric motor-generator according to claim 1, wherein cooling airflow ventilation channels are respectively ensured on an opposite side of said first radiating plate from said housing, on a side of said second radiating plate near said housing, and between said first and second radiating plates when said fan is driven to rotate.

4. An automotive electric motor-generator according to claim 1, wherein an external output terminal is connected to said first radiating plate.

5. An automotive electric motor-generator according to claim 4, wherein said first radiating plate is formed so as to have a radial width that is wider than a radial width of said second radiating plate.

6. An automotive electric motor-generator according to claim 1, wherein said second radiating plate is configured such that three arc-shaped radiating plate segments that respectively correspond to each of three phases are arrayed in a fan shape, a portion of an electrode member that has negative potential is disposed in a common plane with a mounting surface of said second switching element on said three radiating plate segments in close proximity to said three radiating plate segments, and a source terminal of said second switching element that is mounted to said three radiating plate segments is connected to a portion of said electrode member.

7. An automotive electric motor-generator according to claim 6, wherein said electrode member that has negative potential is connected to said housing.

8. An automotive electric motor-generator according to claim 6, wherein said three radiating plate segments and said electrode member that has negative potential are molded integrally by an insulating resin.

9. An automotive electric motor-generator according to claim 1, wherein said second radiating plate is fixed to said housing by means of an insulating member.

* * * * *